US009930430B2

(12) United States Patent
Elder

(10) Patent No.: US 9,930,430 B2
(45) Date of Patent: Mar. 27, 2018

(54) SEISMIC DATA RELAY WITH SIMULTANEOUS TRANSMIT AND RECEIVE USING BEAMFORMING RADIO

(71) Applicant: Wireless Seismic, Inc., Sugar Land, TX (US)

(72) Inventor: Keith Elder, Richmond, TX (US)

(73) Assignee: Wireless Seismic, Inc., Sugar Land, TX (US)

( * ) Notice: Subject to any disclaimer, the term of this patent is extended or adjusted under 35 U.S.C. 154(b) by 0 days.

(21) Appl. No.: 15/290,763

(22) Filed: Oct. 11, 2016

(65) Prior Publication Data

US 2017/0208373 A1 Jul. 20, 2017

Related U.S. Application Data

(60) Provisional application No. 62/239,653, filed on Oct. 9, 2015.

(51) Int. Cl.
*H04Q 9/00* (2006.01)
(52) U.S. Cl.
CPC .......... *H04Q 9/00* (2013.01); *H04Q 2209/25* (2013.01); *H04Q 2209/40* (2013.01)

(58) Field of Classification Search
CPC ............................ H04Q 9/00; H04Q 2209/40
USPC ...................................................... 340/870.07
See application file for complete search history.

(56) References Cited

U.S. PATENT DOCUMENTS

2006/0155840 A1\* 7/2006 Giffin ................ H04B 7/18578
709/224
2012/0163207 A1\* 6/2012 Dua ...................... H04L 1/0015
370/252

\* cited by examiner

*Primary Examiner* — Tanmay Shah
(74) *Attorney, Agent, or Firm* — Marsh Fischmann & Breyfogle LLP

(57) ABSTRACT

Apparatuses, systems, and methods for use of directionalized antennas at a seismic module in a seismic survey array to allow for simultaneous transmission and reception of data in a serial data transfer line. The directionalized antenna may be selectively controlled such that the control of the transmission functionality and reception functionality are independently controlled to transmit data in and receive data from different directions. In turn, bandwidth utilization may be improved in the survey.

19 Claims, 25 Drawing Sheets

SEISMIC DATA RELAY WITH SIMULTANEOUS TRANSMIT AND RECEIVE USING BEAMFORMING RADIO

CROSS-REFERENCE TO RELATED APPLICATION

This application claims priority from U.S. Provisional Application No. 62/239,653 filed on Oct. 9, 2015 entitled "SEISMIC DATA RELAY WITH SIMULTANEOUS TRANSMIT AND RECEIVE USING BEAMFORMING RADIO," the contents of which are incorporated by reference herein as if set forth in full.

BACKGROUND

Seismic surveys are often used by natural resource exploration companies and other entities to create images of subsurface geologic structure. These images are used to determine the optimum places to drill for oil and gas and to plan and monitor enhanced resource recovery programs among other applications. Seismic surveys may also be used in a variety of contexts outside of oil exploration such as, for example, locating or storing subterranean water and planning road construction.

A seismic survey is normally conducted by placing an array of vibration sensors (accelerometers or velocity sensors called "geophones") on the ground, typically in a line or in a grid of rectangular or other geometry. Vibrations are created either by explosives or a mechanical device such as a vibrating energy source or a weight drop. Multiple energy sources may be used for some surveys. The vibrations from the energy source propagate through the Earth, taking various paths, refracting and reflecting from discontinuities in the subsurface, and are detected by the array of vibration sensors. Signals from the sensors are amplified and digitized, either by separate electronics or internally in the case of "digital" sensors. The survey might also be performed passively by recording natural vibrations in the Earth.

The digital data from a multiplicity of sensors is eventually recorded on storage media, for example magnetic tape, or magnetic or optical disks, or other memory device, along with related information pertaining to the survey and the energy source. The energy source and/or the active sensors are relocated and the process continued until a multiplicity of seismic records is obtained to comprise a seismic survey. Data from the survey are processed on computers to create the desired information about subsurface geologic structure.

Recently, seismic survey systems have been proposed that employ wireless telemetry to communicate seismic data between modules. For example, modules may communicate from remote modules to a central recording station or the like along data transfer paths established among the modules in an array. Accordingly, communications of modules within a serial data transfer path or between different serial data transfer paths may be subject to interference. The interference between modules may slow or limit the ability to transmit data wirelessly, which may in turn slow or add cost to a seismic survey.

SUMMARY

The present disclosure generally relates to the use of directionalized antenna techniques (e.g., beamforming radio techniques) to increase the available bandwidth and reduce latency for wireless data transfer among data transfer modules in a seismic survey system. Specifically, it has been recognized that the geometric configuration of data transfer units in a seismic survey may provide beneficial characteristics for the use of directionalized antenna techniques to allow for simultaneous reception and transmission at a given data transfer module based on control of directionalized energy characteristics of an antenna at the data transfer module. Specifically, because many seismic surveys are arranged such that data transfer modules are arranged in a line of modules belonging to a serial data path, the directionalized patterns of the antennas for data transfer modules within the serial data path may be offset by roughly 180°, thus allowing for maximum spatial separation of the directionalized fields for reception and transmission at a given data transfer module. That is, data transfer modules may be arranged linearly in an array of data transfer modules such that a direction of reception and a direction of transmission for a given data transfer module to adjacent upstream and downstream modules, respectively, may be in generally opposite directions relative to the given data transfer module.

Additionally or alternatively, a variety of radio modalities or other technologies (e.g., modulation techniques, frequency allocations, circular polarities, etc.) may be used so as to further reduce potential interference in the array, either between adjacent communicating pairs of data transfer modules or locally at a given data transfer module that is simultaneously transmitting and receiving data (e.g., using different, discrete antenna elements of an antenna at the data transfer module). In this regard, significant improvements to the bandwidth and latency for data transfer in a seismic array may be realized utilizing the discussed subject matter found herein, thus assisting in improving wireless readout of data from a seismic survey.

Further still, directionalized or beamformed radio techniques described herein may allow for efficient energy use at a data transfer module of a seismic survey. Specifically, with the increased throughput and reduced latency allowed by the simultaneous transmit and receive capability at a data transfer module, lines of modules may be operated in portions of a duty cycle of the system. That is, lines of modules may be idled to reduce power consumption. This may also allow for efficient use of radio characteristics or modalities within the seismic survey. Further still, use of duty cycle portions in the survey may allow for convenient detouring or skip healing of malfunctioning modules in a given line.

Important to any of the aspects of the present disclosure, the use of a directionalized radio as contemplated herein may be particularly advantageous by simplifying deployment of data transfer modules within a seismic survey field. For instance, previous approaches for use of directionalized antennas within seismic surveys have been contemplated that use fixed directionalized antenna fields. In these contexts, the antennas are required to be carefully and precisely aimed by field technicians when deploying the data transfer modules within the field. Moreover, the directionalized radiation fields for these antennas are fixed and incapable of being modified absent physical movement of the data transfer modules in the field. In turn, upon deployment of such data transfer modules, field technicians must tediously aim the antennas for the data transfer modules to ensure proper orientation relative to other data transfer modules in the field. Moreover, any desired change in the direction of transmission or reception requires a field technician to be physically dispatched to the module for movement thereof.

However, antenna control techniques described herein may allow for dynamic electronic steering of the directionalized radiation fields of an antenna. In this regard, upon deployment of a data transfer module within the field, the data transfer modules may scan to discover adjacent data transfer modules for forming serial data paths within the data transfer modules or modify transmission and/or reception field directions without requiring physical movement or reorientation of the data transfer module once deployed. In this regard, the field technicians used to deploy the data transfer modules may be relieved from the tedious, time-consuming, and costly efforts of aiming or otherwise precisely positioning the data transfer modules in the field. Furthermore, given that the directionalized radiation field pattern may be dynamically altered without physical movement of the data transfer module, approaches that utilize dynamic modification of the direction of the directionalized radiation field pattern may be employed as described in greater detail below.

A first aspect includes a data transfer module for use in a seismic survey. The data transfer module includes a memory, a microprocessor, and a controllably directionalized antenna. The memory includes non-transitive machine-readable instructions for operation of the data transfer module. In turn, the microprocessor is in operative communication with the memory to access the instructions. As such, the microprocessor is operative to control the directionalized antenna based on the instructions for simultaneous transmission of data in a first direction and reception of data from a second direction. The first direction is different than the second direction.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, the first direction may be substantially opposite the second direction. That is, the first direction may be offset (e.g., as measured in azimuth angle difference) by about 180°. As may be appreciated, when the transmission radiation field and the reception radiation field for a given module are directionalized to extend in opposite directions, the potential for self-interference at the module between the transmit and receive signals may be reduced. In this regard, the geometric configuration of the data transfer modules may assist in reducing self-interference as side lobe energy interference may be reduced.

In an embodiment, the controllably directionalized antenna may include a beamforming antenna with a directionalized transmission field pattern that is independently controllable from a directionalized reception field pattern. For instance, the directionalized antenna may include a plurality of discrete antenna elements. The plurality of discrete antenna elements may include at least a first discrete antenna element is utilized for the transmission and at least a second discrete antenna element is utilized for the reception. As such, the microprocessor may be operative to independently control the first discrete antenna element and the second discrete antenna element. Furthermore, in an embodiment, a common transceiver may operate both the first discrete antenna element and the second discrete antenna element. In this regard, rather than including more than one independent radio systems, the data transfer module may use a single radio with independent transmission and reception field directions.

In an embodiment, the data transfer module may further include a transmitter in operative communication with the first discrete antenna element. The transmitter may be operative to receive a first signal from the microprocessor for control of the first discrete antenna element to transmit the first signal using the first discrete antenna element. The data transfer module may also have a receiver in operative communication with the second discrete antenna element. The receiver may be operative to receive a second signal via the second discrete antenna element to provide the second signal to the microprocessor. The transmitter and the receiver may be operative to communicate with the controllably directionalized antenna via a switch for selective control of the respective one of the first discrete antenna element and the second discrete antenna element.

In an embodiment, the data transfer module may have a chassis within which the memory and microprocessor are disposed. The chassis may include a plurality of discrete antenna elements comprising at least the first and the second discrete antenna elements. The plurality of discrete antenna elements may be elevated above the surface of the Earth. For instance, the chassis may be disposed on a support structure to elevate the plurality of discrete antenna elements above the surface of the Earth. Additionally or alternatively, the data transfer module may include a mast having a first end operatively attached with the chassis and a second end, opposite the first end, at which the first discrete antenna element and the second discrete antenna element may be located. In this regard, the mast may extend from the chassis such that the second end is separated from the first end by an antenna height. The mast may include a cylindrical antenna support disposed at the second end. The first discrete antenna element and the second antenna element may be disposed at opposite relative orientations relative to the cylindrical antenna support. Additionally, the cylindrical antenna support may include a plurality of antenna elements that include the first discrete antenna element, the second discrete antenna element, and at least one other discrete antenna element. For instance, the plurality of antenna elements may include at least 8 discrete antenna elements.

In an embodiment, the data transfer module may include at least one waveguide that is disposed relative to the plurality of discrete antenna elements to reduce interference of the first discrete antenna and the second discrete antenna element. The at least one waveguide may include a metallic fin extending between the first discrete antenna element and the second discrete antenna element. Additionally or alternatively, the at least one waveguide may include a metallic shield extending relative to the plurality of discrete antenna elements and having slotted apertures disposed relative to each of the first discrete antenna element and the second discrete antenna element that limit the radio field of the respective first discrete antenna element and the second discrete antenna element. For instance, the waveguides may be disposed relative to the first antenna element and the second antenna element to limit the azimuth angle through which a radiation field pattern for each respective antenna element extends. Whether through use of a waveguide, antenna element design, or by other means, an azimuth angle of the radiation field pattern may be 70° or narrower for each discrete antenna element. A polar angle of the radiation field pattern may be 140° or wider for each discrete antenna element.

In an embodiment, the transmission of data in the first direction uses a first radio mode, and the reception of data in the second direction uses a second radio mode. The first mode may use a first frequency and the second mode may use a second frequency different than the first frequency. Additionally or alternatively, the first mode may use a first circular polarity and the second mode may use a second circular polarity different than the first circular polarity.

In an embodiment, the data transfer module may also include a geophone for acquisition of seismic data. Accordingly, the seismic data acquired by the geophone may be transmitted in the first direction to another module in the seismic survey. Additionally or alternatively, the module may be in operative wireless communication with one or more acquisition modules remote from the data transfer module such that the data transfer module receives seismic data from the one or more acquisition modules, and the seismic data received from the one or more acquisition modules is transmitted in the first direction. In an alternative embodiment, the data transfer module does not include a seismic sensor and all seismic data transmitted from the device is received from another device. In such an embodiment, the data transfer module may receive seismic data from one or more acquisition modules. The data transfer module may communicate with the one or more acquisition modules using a first radio mode different than a second radio mode used for at least one of the transmission and the reception. For instance, the data transfer module may communicate with the one or more acquisition modules using a second radio different than a first radio that utilizes the directionalized antenna.

In an embodiment, the reception of data from the second direction is from an upstream module in the seismic survey relative to the module, and the transmission of data in the first direction is to a downstream module in the seismic survey relative to the module. Seismic data received from the upstream module from the second direction may be transmitted in the first direction to the downstream module.

A second aspect includes a method for operation of a data transfer module in a seismic survey. The method may include transmitting first seismic data from the data transfer module in a first radiation field pattern extending in a first direction using a directionalized antenna and receiving second seismic data at the data transfer module from a second radiation field pattern extending in a second direction using the directionalized antenna. The transmitting and receiving occur simultaneously.

A number of feature refinements and additional features are applicable to the second aspect. These feature refinements and additional features may be used individually or in any combination. As such, each of the following features that will be discussed may be, but are not required to be, used with any other feature or combination of features of the second aspect. For instance, the method of the second aspect may employ a module according to any of the features described for a data transfer module of the first aspect.

A third aspect includes a seismic survey system for transfer of seismic data. The system includes a plurality of data transfer modules operative for relay of seismic data from a distal module of the plurality of data transfer modules to a proximal module of the plurality of data transfer modules along a serial data transfer path defined by the plurality of data transfer modules including at least one relay module disposed between the distal module and the proximal module. The distal module, the relay module, and the proximal module may be arranged linearly to define the serial data transmission path. At least the relay module includes a directionalized antenna controllable by a processor of the relay module to target reception of seismic data from the distal module and to target transmission of seismic data to the proximal module. The targeted reception of seismic data from the distal module occurs simultaneously with the transmission of seismic data to the proximal module.

A number of feature refinements and additional features are applicable to the third aspect. These feature refinements and additional features may be used individually or in any combination. As such, each of the following features that will be discussed may be, but are not required to be, used with any other feature or combination of features of the third aspect.

For instance, in an embodiment a first pair of the plurality of modules communicate using a first radio mode and a second pair of the plurality of modules communicate using a second radio mode different than the first radio mode. The first radio mode may include a first modulation technique and the second radio mode may include a second modulation technique different than the first modulation technique. For instance, the first pair of the plurality of modules may be upstream in the survey system relative to the second pair, and the first modulation technique comprises lower bandwidth and reduced error rate relative to the second modulation technique. Specifically, the first modulation technique may be binary phase-shift keying and the second modulation technique may be quadrature amplitude modulation.

In an embodiment, any or all of the plurality of modules may include local geophones for acquisition of seismic data at each respective one of the plurality of modules. In turn, the acquired seismic data may be transmitted from each respective one of the plurality of modules is transmitted along the serial data transfer path. Alternatively, any or all of the plurality of modules may be a concentrator module in operative wireless communication with a plurality of acquisition modules. In this regard, the concentrator module may not include a seismic sensor and may be operative to receive seismic data from the plurality of acquisition modules and relay the seismic data along the serial data transfer path. In this regard, the wireless communication between the plurality of acquisition modules and the concentrator module may use a first radio mode, and a second radio mode may be used to communicate along the serial data transfer path.

A fourth aspect includes a method of operation of a seismic survey system. The method includes disposing, in series, a plurality of modules that are operative to wirelessly communicate seismic data to define a survey array, wherein the plurality of modules define at least one serial data transfer path for relaying seismic data from upstream modules to downstream modules and a data collection unit. The method also includes scanning, using a directionalized antenna of at least one module of the plurality of modules, to receive a signal from at least an adjacent upstream module of the plurality of modules and an adjacent downstream module of the plurality of modules to establish radio contact with the adjacent upstream module and the adjacent downstream module. The at least one module, the adjacent upstream module, and the adjacent downstream module are arranged linearly in the survey array. In turn, the method also includes targeting the directionalized antenna of the at least one module in a reception direction toward the upstream module to receive seismic data from the adjacent upstream module and in a transmission direction toward the adjacent downstream module to transmit seismic data toward the adjacent downstream module. The method includes receiving seismic data from the adjacent upstream module at the directionalized antenna of the at least one module and transmitting seismic data from the directionalized antenna at the least one module to the adjacent downstream module.

A number of feature refinements and additional features are applicable to the fourth aspect. These feature refinements and additional features may be used individually or in any combination. As such, each of the following features that will be discussed may be, but are not required to be, used with any other feature or combination of features of the fourth aspect.

For instance, the scanning may include selectively controlling a plurality of antenna elements to measure a received signal strength indication (RSSI) from the adjacent upstream module and the adjacent downstream module. The targeting may include selectively controlling a plurality of antenna elements to independently establish the reception direction and the transmission direction.

In an embodiment, the transmitting may use different radio modes. For instance, the different radio modes may include different frequencies. Additionally or alternatively, the different radio modes may include different modulation. Further still, the different radio modes may include different circular polarities.

A fifth aspect includes a seismic survey system for transfer of seismic data among a plurality of data transfer modules of the seismic survey system. The system includes a plurality of data transfer modules operative for relay of seismic data along a serial data transfer path defined by the plurality of data transfer modules. Specifically, the system includes a first module of the plurality of data transfer modules that is operative to transmit, using a first directionalized antenna at the first module, a first signal comprising first seismic data in a first radiation pattern field in a first direction using a first radio mode. The system also includes a second module of the plurality of data transfer modules that is operative to receive, using a second directionalized antenna at the second module with directionalized sensitivity in the first direction of the first radiation pattern field, the first signal comprising the first seismic data using the first radio mode. The second module of the plurality of modules is also operative to transmit, using the second directionalized antenna at the second module, a second signal comprising second seismic data in a second radiation pattern field in a second direction using a second radio mode. The system also includes a third module of the plurality of data transfer modules that is operative to receive, using a third directionalized antenna at the third module with directionalized sensitivity in the second direction of the second radiation pattern field, the second signal comprising the second seismic data using the second radio mode. The third module of the plurality of modules is also operative to transmit, using the third directionalized antenna at the third module, a third signal comprising third seismic data in a third radiation pattern field in a third direction using a third radio mode. The first, second, and third radio modes are different, and the first, second, and third directions are collinear.

A number of feature refinements and additional features are applicable to the fifth aspect. These feature refinements and additional features may be used individually or in any combination. As such, each of the following features that will be discussed may be, but are not required to be, used with any other feature or combination of features of the fifth aspect. For instance, any of the other feature refinements or additional features described in relation to the other aspects of the present disclosure are equally applicable to the fifth aspect.

A sixth aspect includes a data transfer module that includes a first radio and a second radio. The first radio is in operative communication with a directionalized antenna for simultaneous reception and transmission of seismic data at the data transfer module between a plurality of other data transfer modules in a serial data transfer path comprising the data transfer model and the plurality of other data transfer modules. The second radio is for communication of administrative data between the plurality of data transfer modules of the serial data transfer path. Specifically, the administration data at least comprises an acknowledgement signal comprising an indication of whether seismic data communicated on the first radio is successfully received at downstream modules of the serial data transfer path.

A number of feature refinements and additional features are applicable to the sixth aspect. These feature refinements and additional features may be used individually or in any combination. As such, each of the following features that will be discussed may be, but are not required to be, used with any other feature or combination of features of the sixth aspect. For example, the second radio may be omnidirectional. In an embodiment, the administrative data may include a discovery signal that may be used to establish communication with adjacent data transfer modules. Further still, the second radio may be operative to communicate with a plurality of data acquisition modules.

A seventh aspect includes a seismic survey system. The system includes a first plurality of data transfer modules, disposed in series, that are operative to wirelessly communicate seismic data along a first serial data transfer path for relaying seismic data from upstream data transfer modules to downstream data transfer modules within the first serial data transfer path and a data collection unit. Additionally, the system includes a second plurality of data transfer modules, disposed in series, that are operative to wirelessly communicate seismic data along a second serial data transfer path for relaying seismic data from upstream data transfer modules to downstream data transfer modules within the second serial data transfer path and a data collection unit. In a first time period, the first plurality of data transfer modules transmit seismic data along the first serial data transfer path by simultaneous receipt and transmission of seismic data at each data transfer module of the first plurality of data transfer modules using a directionalized antenna. In a second time period distinct from the first time period, the second plurality of data transfer modules transmit seismic data along the second serial data transfer path by simultaneous receipt and transmission of seismic data at each data transfer module in the second plurality of data transfer modules.

A number of feature refinements and additional features are applicable to the seventh aspect. These feature refinements and additional features may be used individually or in any combination. As such, each of the following features that will be discussed may be, but are not required to be, used with any other feature or combination of features of the seventh aspect.

For instance, the first plurality of data transfer modules may use a first set of radio characteristics in the first time period and the second plurality of data transfer modules may use the first set of radio characteristics in the second time period. That is, the radio characteristics may be reused during different portions of a duty cycle of the system. This may allow for more efficient use of a limited number of distinguishing radio characteristics.

In another embodiment, the system may include a third plurality of data transfer modules, disposed in series, that are operative to wirelessly communicate seismic data along a third serial data transfer path for relaying seismic data from upstream data transfer modules to downstream data transfer modules within the third serial data transfer path and a data collection unit. Accordingly, in a third time period distinct from the first time period and the second time period, the third plurality of data transfer modules may transmit seismic data along the third serial data transfer path by simultaneous receipt and transmission of seismic data at each data transfer module in the third plurality of data transfer modules.

In one application, the system may include a third plurality of data transfer modules, disposed in series, that are operative to wirelessly communicate seismic data along a third serial data transfer path for relaying seismic data from upstream data transfer modules to downstream data transfer modules within the third serial data transfer path and a data collection unit. In the first time period, the third plurality of data transfer modules may transmit seismic data along the third serial data transfer path by simultaneous receipt and transmission of seismic data at each data transfer module in the third plurality of data transfer modules. In this regard, the third plurality of data transfer modules may be spatially separated from the first plurality of data transfer modules to avoid radio interference therewith. In this application, the first plurality of data transfer modules and the third plurality of data transfer modules may utilize a common set of radio characteristics in the first time period.

In an embodiment of the system, in the first time period, at least a first data transfer module of the first plurality of data transfer modules communicates seismic data to a second data transfer module of the second plurality of data transfer modules that communicates the seismic data to a third data transfer module of the first plurality of data transfer modules. The communication between the first data transfer module, the second data transfer module, and the third data transfer module may occur simultaneously using directionalized radio. In this regard, the communication with the second data transfer module in the second serial data transfer path may bypass a malfunctioning data transfer module in the first serial data transfer path.

DETAILED DESCRIPTION

Figure 1:
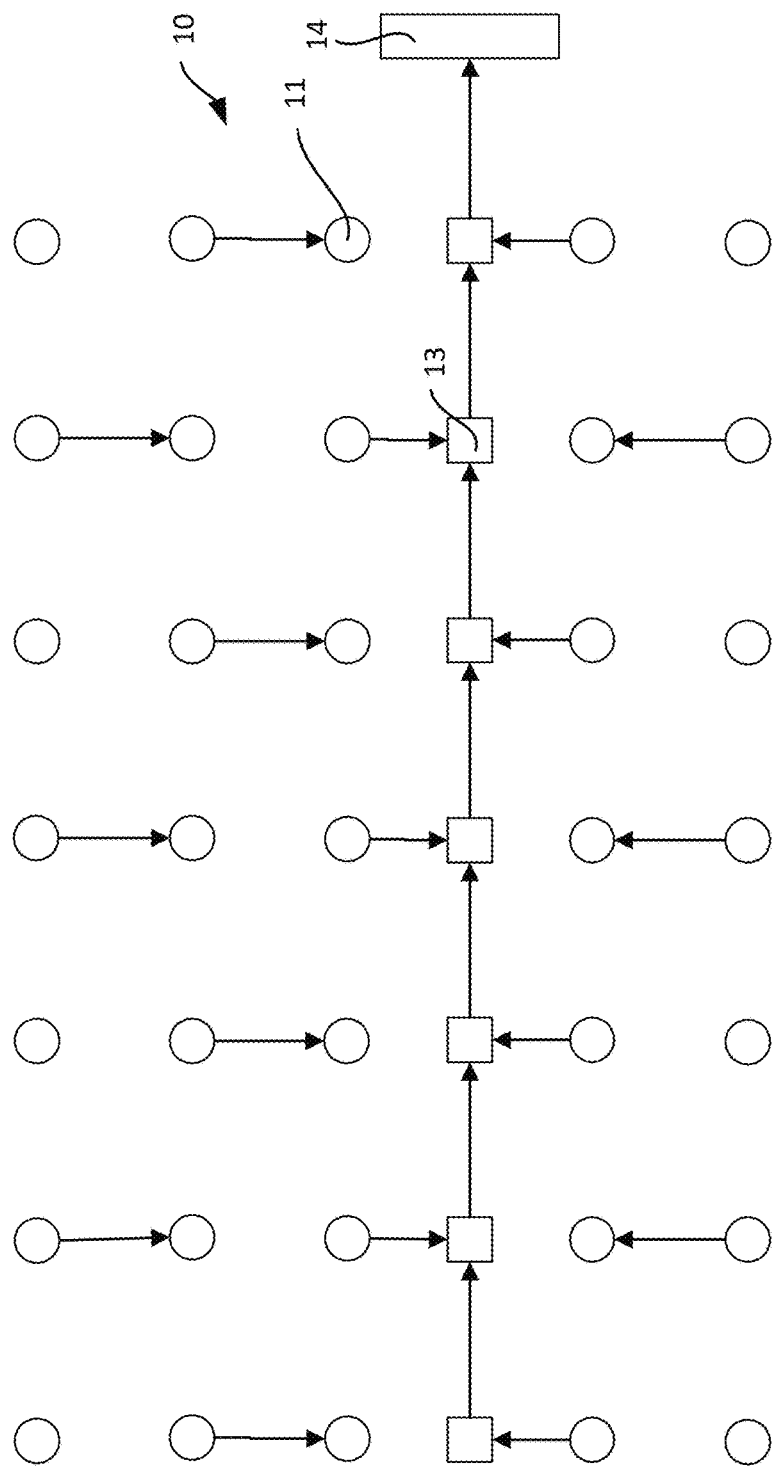
FIG. 1 is a schematic view of an embodiment of a seismic survey system deployed in an array of data transfer modules.

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

As described above, the present disclosure relates to the use of directionalized antennas (i.e., antennas that utilize beamforming for dynamically controlling the direction of transmission of, or sensitivity to, radio frequency (RF) energy) of seismic survey data transfer modules or nodes for improvement of bandwidth and latency for data transmission in a seismic survey system. As will be described in detail below, the use of an autonomously controllable, directionalized antenna at a data transfer module may allow for decoupling of receiving and transmission directions associated with the antenna at a data transfer module such that a single given module equipped with a directionalized antenna may receive data from another module in a first direction while simultaneously transmitting data to another module in a second, different direction. In certain instances of the present disclosure, the first and second directions may generally be opposite or separated by roughly 180°. As may be appreciated in the discussion found herein, simultaneous receipt and transmission of data at modules in a seismic array may advantageously improve data transfer rates and reduce latency within an array of data transfer modules and may beneficially reduce interference within the array.

It is further realized that the use of directionalized antennas to allow for simultaneous transmission and receipt of data at a data transfer module in different relative directions may be particularly suited to use in seismic survey systems that use wireless data transfer modules. While not required in all embodiments, seismic surveys may include an array of data transfer modules that include lines of data transfer modules to form one or more serial data transfer paths for wireless communication of serial data along the serial data transfer paths. As these paths are generally linear, directionalizing of the antenna receipt/transmission patterns individually may be facilitated such that a given module may receive and transmit data in substantially opposite directions (e.g., at 180° of separation relative to the azimuth plane as described below). This may reduce self-interference between the transmission and receipt of data at a given module. For instance, while use of a directionalized antenna generally produces a predominant lobe of RF energy, there may also be side and or back lobe creation of energy that may, for example, interfere with operation of another independent communication path at the directionalized antenna. For instance, discrimination at a receiving element at a given module between transmitted data from the given module and data received from another module requires generally 30 dB of isolation between the receiving element and transmitting element of the given module to prevent self-interference at the given module. In the present case where the transmit and receive directions are generally opposite one another, this isolation may be achieved such that the transmitted data from a given module may not interfere with reception of data at the given module from another module.

The present disclosure generally uses the terms "transmit direction" and "receive direction." Alternatively, the present disclosure may refer to a radiation field pattern direction in relation to either transmission or reception. It is to be understood that, based on the fundamental property of reciprocity of antennas, the receiving pattern described as sensitivity to RF energy as a function of direction when used for receiving a signal is identical to the radiation pattern of the antenna when used for transmitting RF energy. Accordingly, it will be recognized that a receive direction or a radiation field pattern direction described in relation to receipt of a signal generally relates to the predominant direction of receiver sensitivity for a beamformed antenna. Moreover, a transmit direction or a radiation field pattern direction described in relation to transmission of a signal generally relates to the predominant direction of the energy field for a beamformed antenna. That is, a directionalized antenna may include side lobe energy that is generally not in the primary direction referred to, however it is to be understood that such side lobe energy is minimal compared to the predominant direction of the directionalized radiation field pattern such that any such side lobe energy may be sufficiently small in relation to the primary direction of the directionalized radiation field pattern. Moreover, the control functionality for directionalized in the sensitivity or energy propagation capability of an antenna may generally utilize the same control logic (including common use of specific hardware) or operating approaches.

In the techniques described herein, additional isolation between transmit and receiving directions may be facilitated by use of different radio modes to further provide isolation between transmitted and received data that are each respectively associated with different radiation field directions. That is, in addition to the advantageous spatial arrangements described herein, different radio modes may also be used to assist in signal discrimination to further reduce the potential for inter-module interference and/or self-interference between simultaneous transmission and reception at a given module. For example, radio modes where different frequencies are available for use by data transfer modules may further allow for discrimination between signals originating at another module versus those transmitted from the receiving module by use of different frequencies that may be discriminated at the data transfer module. For instance, offset frequencies may be used at a given module between the transmitting and receiving portions such that isolation between the signals at the given module may be achieved. That is, a first frequency may be predetermined or otherwise coordinated for receipt of data at a given module from an upstream module while a second, different frequency is used for transmission of data from the given module to a downstream module. Accordingly, any transmitted energy from a given module may be further discriminated at the given module to prevent self-interference. Other approaches to isolation at the antenna may also be used that may include, for example, signal processing techniques, physical configurations (e.g., use of physical waveguides), polarization of the radio signals, use of different modulation techniques, or other isolation approaches without limit, some of which are described in greater detail below.

In addition, different modulation techniques may be employed at different locations along a serial data transfer path. This may allow for different modulation techniques to be employed at different locations within the array that may be subjected to different data transfer requirements. For example, at distal modules in an array, the size of the data to be transmitted may be relatively small such that a bandwidth intensive yet low error modulation technique may be utilized. In contrast, proximal modules in the array, the size of the data to be transmitted may be relatively large based on the aggregation of data from modules upstream in the array. In such proximal modules, a modulation technique may be utilized that efficiently uses bandwidth yet increases susceptibility to error. Proximal may refer to a direction toward central recording unit, and distal may refer to a direction away from a central receiving unit.

Turning to the drawings, FIG. 1 depicts an example schematic of an embodiment of a wireless seismic survey with which the techniques described herein may be used. The survey may be conducted using an array 10 of data transfer modules 11. In general, the modules 11 communicate seismic data toward a line interface unit 13. In this regard, the modules 11 may be referred to as data transfer modules because the modules are utilized in the relay of data from distal modules away from the line interface unit 13 toward proximal modules near the line interface unit 13. In turn, a direction toward the line interface unit 13 or central recording unit 14 may be referred to as "downstream." A direction away from the line interface unit 13 or central recording unit 14 may be referred to as "upstream." A backhaul among the line interface units may transmit data to the central recording unit 14. Details for any and all aspects of such surveys may be according to U.S. Pat. No. 7,773, 457, which is incorporated by reference in its entirety herein.

Such surveys generally utilize a data transfer scheme as depicted in FIG. 1. The data transfer modules 11 may include data acquisition capability (e.g., include a geophone or the like) or may be relay modules that receive data from one or more other modules (e.g., the data transfer module 11 may be a concentrator module for use in relay of data). Pairs of modules within the survey may communicate data such that one module of the pair transmits data while the other module of the pair is in a receiving mode to receive the transmitted data from the transmitting module of the pair. In a subsequent time period, each module may switch from the mode previously utilized in the prior time period (e.g., switch from receiving to transmitting or from transmitting to receiving). In this regard, the alternating telemetry has been referred to a "bucket brigade" as data is alternatively transmitted and received between pairs of adjacent modules in alternating time periods with each module either dedicated to receiving or transmitting in a given time period.

While such systems may employ distinct frequencies or other radio characteristics that allow for signal discrimination to avoid interference between adjacent communicating pairs within a given serial data communication path of a plurality of modules, the systems are generally limited to a time restricted division of the bandwidth available wherein each module alternates between transmission of data to a downstream module and receipt of data from an upstream module. As each of these states must occur in distinct, alternating time periods, the data bandwidth of such systems is limited as data only flows from every other module in every other time period. Furthermore, latency may be increased as well. In turn, such approaches represent a half-duplex approach whereby the time domain at a given module must be split between transmission and reception at each given module.

Additionally, directionalized antennas have been proposed to be used in conjunction with such seismic surveying systems. For instance, U.S. patent application Ser. No. 14/042,251 is incorporated by reference in its entirety herein. This disclosure generally describes use of a directionalized antenna to reduce interference between modules, in initializing an array, or in assisting in locating adjacent modules. Specifically, the use of a directionalized antenna in this context may avoid cross-line interference between adjacent serial data transmission paths.

However, in the present disclosure, it has been recognized that a directionalized antenna may be further utilized for additional improvements to data transfer in a seismic survey system. For instance, in the case of a directionalized antenna, it has been recognized that a directionalized antenna can be controlled to allow for simultaneous receipt and transmission of data at a single data transfer module by using different directions of reception and transmission at an antenna of the data transfer module. Specifically, simultaneous transmission and reception may be achieved by controlling the directionalized reception radiation field and transmission radiation field for RF energy at the data transfer module. That is, by divorcing the transmit and receive functions (e.g., specifically the directions thereof) for an antenna and separately controlling each, a module may be configured to transmit in a first direction while receiving information from a second direction at the same time. For example, directionalized antenna having an array of antenna elements may be controlled such that a first one or more of the antenna elements are tuned for reception of data at a module while a second one or more of the antenna elements are tuned to transmit data from the module at the same time without interference. As will be discussed below, the antenna may be controlled by a common radio.

Figure 2:
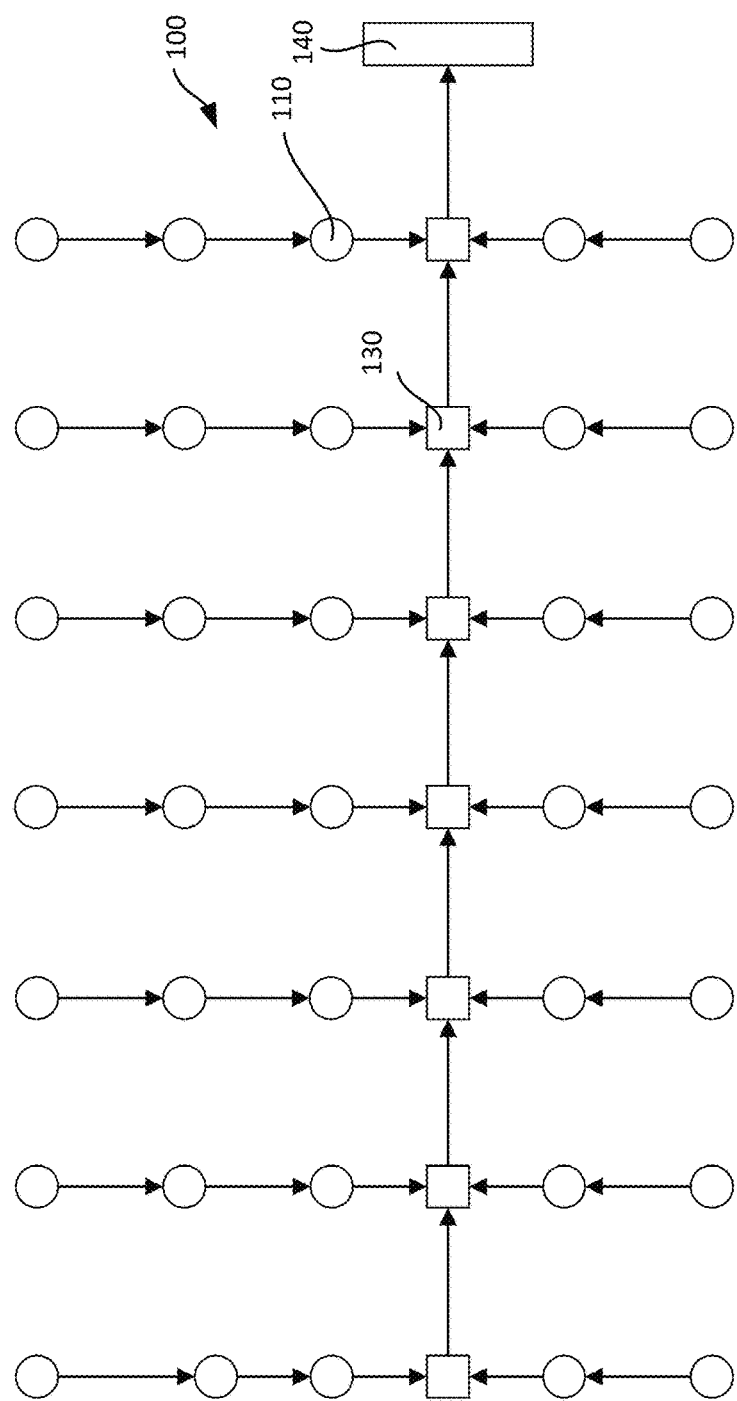
FIG. 2 is a schematic view of an embodiment of a seismic survey system deployed in an array utilizing directionalized transmission and receipt of data at modules within the array.

In turn, as will be described in greater detail below, the use of a directionalized antenna for simultaneous reception and transmission of data at a module may facilitate an array 100 as depicted in FIG. 2. FIG. 2 depicts a single moment in time of the array 100 where each data transfer module 110 may simultaneously receive data from an upstream module and transmit seismic data to a downstream module. In turn, the requirement to alternate between a transmission state and reception state at each module to perform the "bucket brigade" or half-duplex approach may be eliminated and each module may simultaneously receive and transmit data such that no alternating between transmission and reception states is required. Accordingly, a data transfer module capable of full-duplex communication may be provided in which a portion of, a majority of, or all of the duty cycle of a module may be dedicated to full-duplex throughput of data at the data transfer module (i.e., transmission and reception may occur at the same time). In turn, the simultaneous reception and transmission of data at such a module 110 in the array 100 may provide improved data bandwidth and reduce latency within the array.

Specifically, each data transfer module 110 in the array may simultaneously receive data from an upstream module and transmit data to a downstream module. As such, data may be continuously streamed along a serial data transmit path defined by a plurality of data transfer modules 110. The data may be transmitted along the serial data transmit path including modules 110 that simultaneously receive and transmit data until the data arrives at a line interrupt unit 140 where it may be provided to a central recording unit 140 via a backhaul network.

Figure 3:
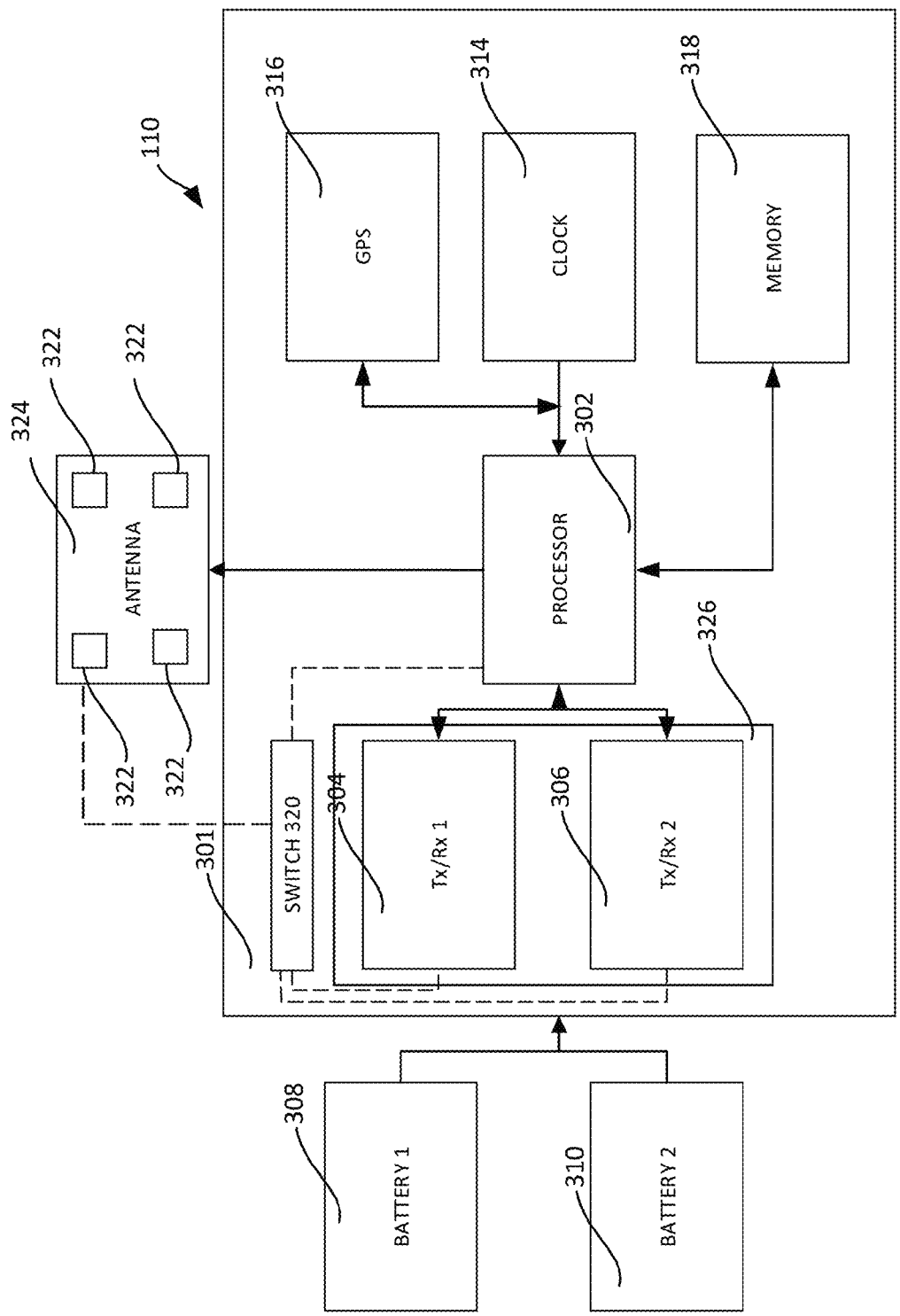
FIG. 3 is a schematic of an embodiment of a module for simultaneous transmission and reception via a directionalized antenna.

FIG. 3 depicts a schematic of an embodiment of a module 110 that may facilitate simultaneous transmission and reception using a directionalized antenna 324. The module 110 may include a processor 302 in operative communication with a memory 318. The processor 302 may read data from the memory 314 and write data to the memory 318. The memory 318 may also have a non-volatile portion in which data comprising non-transitory machine readable instructions for configuring the processor 302 to perform in a predefined manner may be stored. Specifically, the memory 318 may include instructions for operation of the antenna 324 and a radio front-end 326. In this regard, the instructions may include logic for beamforming a radio transmission or antenna sensitivity in a given direction relative to the data transfer module 110. As such, the processor 302 may be operative to access the non-transitory computer readable data from the memory 318 that provides instructions for configuration of the processor 302 to control operation of the module 110 in a manner described herein.

As depicted in FIG. 3, the processor 302, memory 318, and other various components described below may be housed or disposed within a chassis 301. The chassis 301 may provide an enclosure in which any and all of the various components described herein are disposed. Specifically, the chassis 301 may provide protection to the various components housed therein from environmental conditions such as moisture, temperature, shock, or the like.

The module 110 may be provided with batteries 308 and 310 to provide power to the module 110 and the various components thereof. As depicted, the batteries 308 and 310 may be discrete units that allow for redundancy and/or hot-swapping of the batteries during operation of the module 110 without interruption. In this regard, the batteries 308 and 310 may selectively mechanically and electrically couple to the chassis 301. Furthermore, the antenna 324 may be operatively engaged with the chassis 301 such that at least a portion of the antenna 324 (e.g., discrete antenna elements 322) are disposed remotely from the chassis 301 as described in greater detail below. Alternatively, the batteries 38/310 and/or antenna 324 may be integral or interval to the chassis 301.

The module 110 may also have a GPS module 316 that may be operative to receive positioning signals and calculate a location of the module 316. The GPS module 316 may provide a synchronization source for synchronizing and/or training a local clock 314. As may be appreciated, the local clock 314 may be utilized in the control of the transmission and/or reception of data at the module 110.

The processor 302 may be in operative communication with an antenna 324 and a plurality of transceiver modules 304 and 306. The antenna 324, while being shown external to the module chassis 301 may alternatively be provided internally to the module chassis 301. In this regard, the antenna 324 may be disposed about a perimeter of the chassis 301 such that discrete antenna elements, as described below, are disposed about the module chassis 301. In an embodiment, the antenna may extend from the module chassis 301 and/or may be selectively engageable to an exterior of the module chassis 301. In still a further embodiment, the module chassis 301 may be elevated above the surface of the Earth where disposed (e.g., on a stand or stanchion or otherwise suspended above the surface the Earth such as by being hung from an elevated structure or the like).

As will be described in greater detail below, the antenna 324 may be an antenna that allows for beamforming of reception sensitivity and/or transmission direction of the antenna. The antenna 324 may include a plurality of discrete antenna elements 322. These discrete antenna elements 322 may be used individually or in combination to perform beamforming such that the radiation fields for reception or transmission of the antenna 324 may be controlled. For example, in an embodiment the antenna 324 may include a phased array antenna that is controllable by the processor 302 such that the plurality of discrete antenna elements 322 may be controlled with respective time delay and/or frequency offsets to achieve controlled directions of the radiation fields for reception and transmission of the antenna 324. These discrete antenna elements may be distributed on the antenna 324 or about the chassis 301 such that certain ones of the elements 322 may be selectively and controllably activated by the processor 302 to control the antenna 324 for reception or transmission of RF energy in a given direction. As the antenna 324 may include a plurality of discrete elements, one or more of the elements may be selectively configured for reception while one or more different ones of the elements may be selectively configured for transmission.

In this regard, the module may include a radio front-end 326 that may be used to coordinate transmission and reception from the module 110. For example, the radio front-end 326 may include a first transceiver 304 that may selectively control a first subset of the elements of the antenna 318. The radio front-end 326 may further include a second transceiver 306 that may simultaneously control a second subset of the elements of the antenna 318. Alternatively, a single transceiver may be provided for control of reception and transmission. The first transceiver 304 and the second transceiver 306 may independently operate separate subsets of elements of the antenna 318 to receive and transmit data via RF communication. The transmit and receive functionalities of the antenna 324 may be divorced such that each function may be independently controlled. As will be appreciated in the discussion to follow, the antenna 324 may be controlled and/or constructed to prevent interference between the various independently operated elements 322 of the antenna 324 such that the reception and transmission may occur simultaneously. In any regard, the processor 302 may be in operative communication with the first transceiver 304 and second transceiver 306 to control operation thereof for coordinated operation of the antenna 324.

In an alternative embodiment, the transceiver 304 and the transceiver 306 may be in operative communication with a switch 320. For instance, the switch 320 may be a field programmable gate array (FPGA) in operative communication with the radio front-end 326 and the antenna 324 to coordinate communication between the radio front-end 326 and various ones of the discrete antenna elements 322 of the antenna 324. In this regard, the transceiver 304 may be operative to provide signals to, or receive signals from, the switch 320. Also, the transceiver 306 may be operative to provide signals to, or receive signals from, the switch 320. In turn, the processor 302 may be operative to control the transceiver 304 and transceiver 306 for provision of signals to the switch 320 or reception of signals from the switch 320. In addition, the processor 302 may control the switch 320 that may be in further operative communication with the discrete antenna elements 322 of the antenna 324. Specifically, the switch 320 may be operative to provide selective electrical communication between the transceiver 304 and/or transceiver 306 and various different ones of the discrete antenna elements 322. Specifically, the processor 302 may provide control to the switch 322 coordinate such selective electrical communication for establishing communication between the transceiver 304 or transceiver 306 with the discrete antenna elements 322.

While a first transceiver 304 is described, it may be appreciated that a dedicated receiver module or a dedicated transmission module may be provided rather than a transceiver, which is capable of transmission and reception. Furthermore, the second transceiver 306 could be provided as a dedicated receiver module or a dedicated transmission module. In this regard, a dedicated receiver module and a dedicated transmitter module may be provided for control of the simultaneous control of the antenna 318. That is, in an embodiment, all reception at the module may be controlled by a dedicated reception module and all transmission may be controlled by a dedicated transmission module. Furthermore, two reception modules may be provided to allow for simultaneous reception from two other modules via the antenna 318 and/or two transmission modules may be provided for simultaneous transmission from the module 110 via the antenna 318. Furthermore, the transceivers 304 and 306 may be selectively controlled to facilitate simultaneous reception from two other modules via the antenna 318, simultaneous transmission from the module 110 via the antenna 318, or simultaneous reception and transmission from the module 110. Furthermore, a single transceiver module may be provided that is capable of independently controlling the transmit and receive functionalities. That is, a single transceiver may be provided that may separately control the transmit and receive functions of the antenna. As such, the direction of the field associated with transmission or reception at the module may be independently controlled and the data to be transmitting and received may be independently processed so as not to cause interference between the transmission and reception of data at the module.

Figure 4:
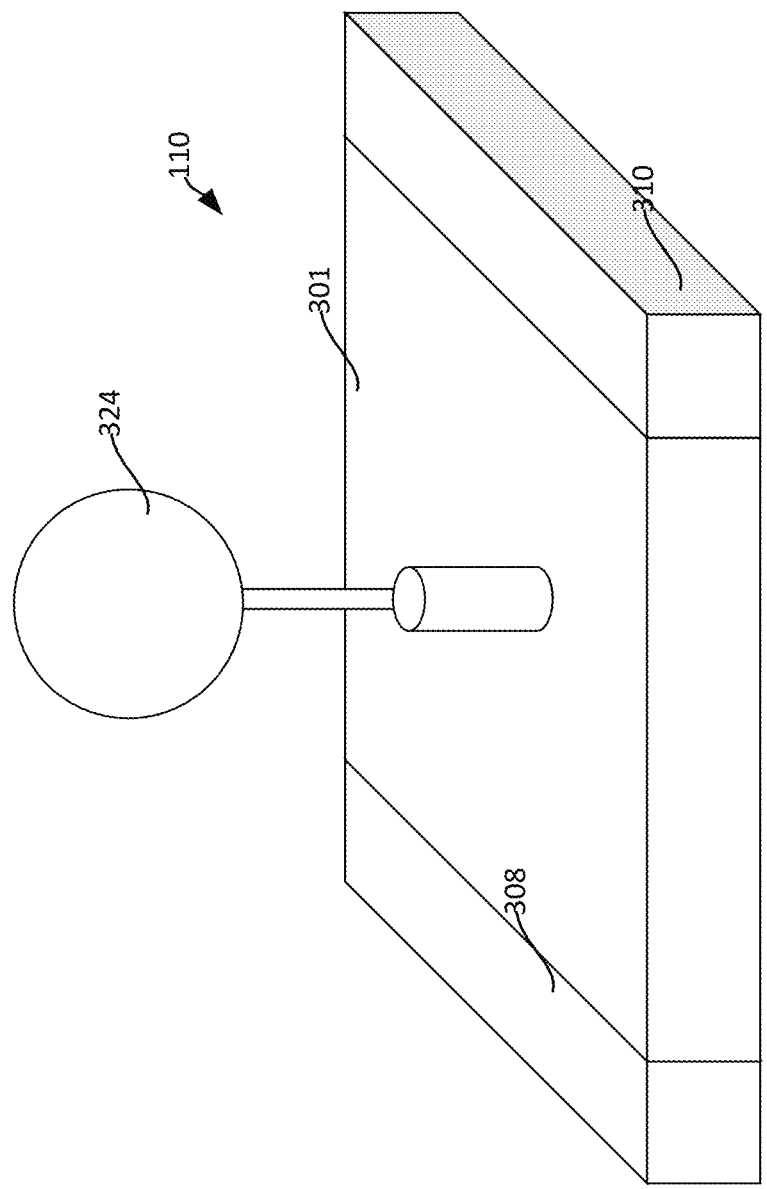
FIG. 4 depicts an embodiment of a module having a directionalized antenna.
Figure 5:
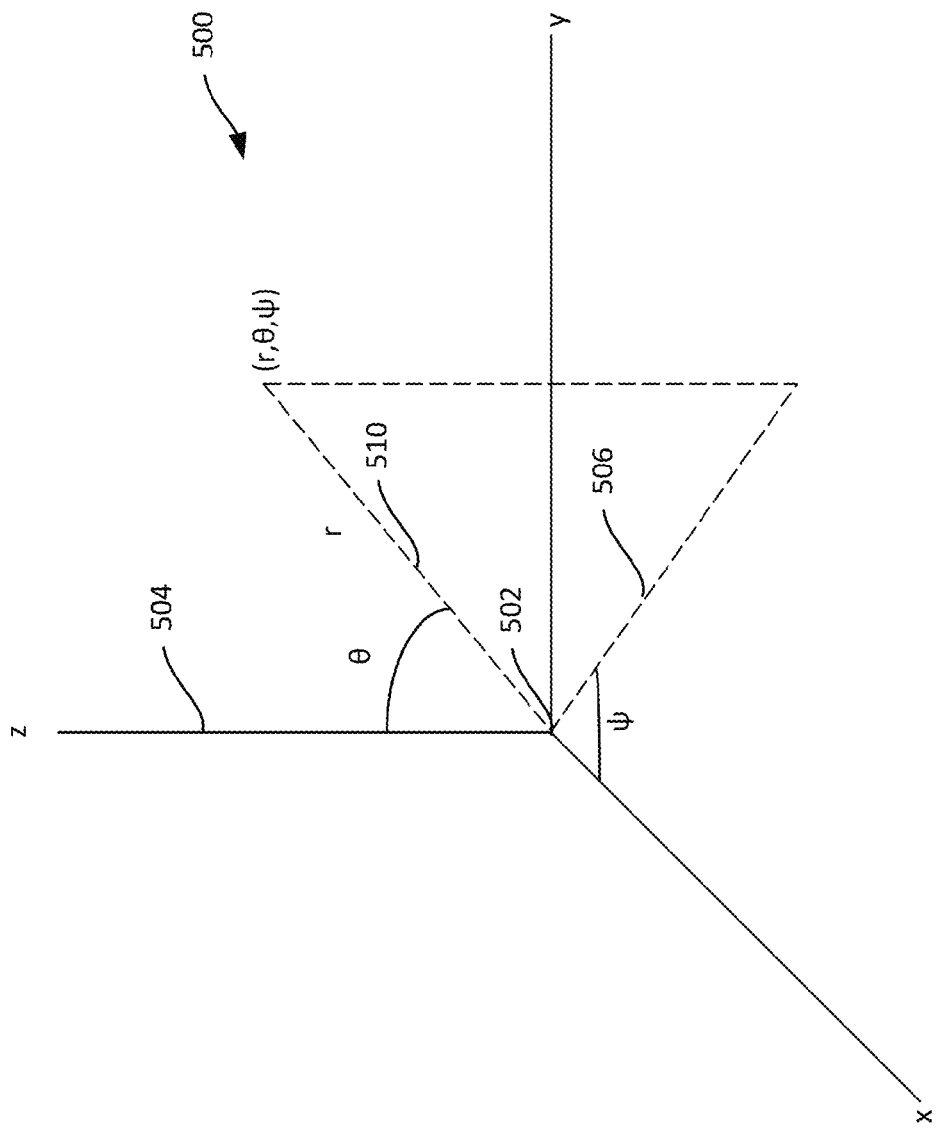
FIG. 5 depicts an example reference coordinate system within which a directionalized field may be controlled by a module.

FIG. 4 depicts an embodiment of a module 110. The module includes a directionalized antenna 324 operatively engaged with the module 110. The directionalized antenna 324 may comprise any selectively directionalized antenna technology without limitation. In this regard, the radiation field for reception and radiation field for transmission by the antenna 324 may be controlled in any direction. Moreover, such control of the direction of the reception and transmission radiation fields of the antenna 324 may be independent of one another. For ease of discussion, the antenna 324 may be controlled in relation to a spherical coordinate system 500 as shown in FIG. 5. The control of the direction of the radiation field pattern for reception or transmission by the antenna 324 may be such that an azimuth angle and/or polar angle may be controlled when the antenna 324 is modeled as a point at the origin of the spherical coordinate system 500. A polar angle θ corresponding to the direction of the radiation field pattern 510 measured from a fixed zenith direction 504 may be controlled. Furthermore, an azimuth angle ψ corresponding to an angle defined in a reference plane 506 corresponding to an orthogonal projection that passes through the origin that is orthogonal to the zenith 504 may be controlled. Furthermore, radial distance r may be controlled based on controlling the relative power of the transmission or reception gain of the antenna 324. In any regard, the direction of the radiation field pattern 510 may be controlled throughout a continuum of direction defined in the spherical coordinate system surrounding the antenna 324.

FIG. 5 shows only a portion of the spherical coordinate system (e.g., corresponding to the positive x, positive y, and positive z directions, it will be understood that the direction in which the radiation pattern may be controlled may extend to all directions in the spherical coordinate system (e.g., including the negative x, negative y, and negative z directions relative to the coordinate system 500 shown in FIG. 5). As such, the radiation pattern 510 may extend in any direction away from the antenna 324 without limitation. Furthermore, as will be appreciated in greater detail below, various elements of the antenna 324 may be used to control distinct directions of radiation patterns 510 (e.g., where one corresponds to a reception direction and the other corresponds to a transmission direction).

Figure 6:
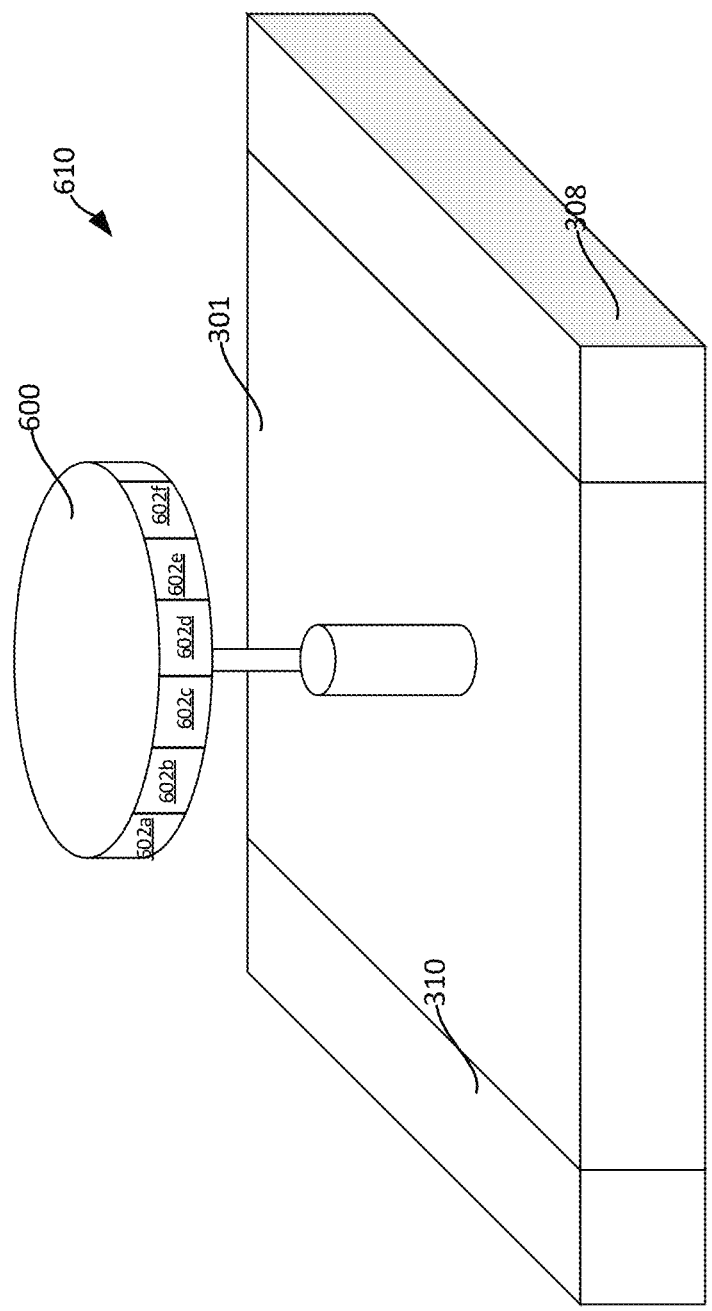
FIG. 6 depicts an embodiment of a module having a directionalized antenna.

FIG. 6. depicts an embodiment of a module 610 that may include an antenna 600 that comprises a segmented element antenna array. In this regard, the antenna 600 may comprise a plurality of elements e.g. 602a, 602b, 602c, 602d, 602e, 602f, etc.). Each of the elements 602 may be arranged about the antenna 600 such that each of the elements 602 is capable transmission in a given direction with respect to the module 610. The antenna 600 may primarily control the direction of transmission in the azimuthal plane (i.e., relative to a horizontal plane on which the module is resting with horizontal being defined relative to the surface of the Earth adjacent to the module). That is, the azimuthal plane may generally be parallel (or tangential) to the surface of the Earth at the given location of the module. This is further illustrated in FIG. 7 which depicts a top view of the module 610 that includes the segmented element antenna array 600. As may be appreciated in FIG. 7, the segmented element antenna array may comprise a 12 sided or generally dodecagon shaped body having an element 602 at each face of the 12 sided antenna. In this regard, each element (602a, 602b, 602c, 602d, 602e, 602f, 602g, 602h, 602i, 602j, 602k, and 602l) may generally be capable of transmitting and/or receiving in 30° increments relative to the acquisition unit 100. In this regard, corresponding radiation pattern directions (e.g., 604a, 604b, 604c, 604d, 604e, 604f, 604g, 604h, 604i, 604j, 604k, and 604l) are depicted to illustrate the transmitting or reception radiation patterns for each corresponding element 602. As depicted, a 12 sided element array is utilized such that the radiation patterns additionally offset by 30°. However, other combinations may be used such as antennas with additional elements with narrower radiation patterns spacing, or fewer elements with wider radiation patterns spacing. For instance, an antenna with eight sides having eight corresponding elements offset by 45° increments may be provided. In any regard, each one of the elements 602 may be independently controlled by the processor of the module to control transmission and/or reception from the module.

While individual transmission paths are depicted in relation to each individual element, it may be appreciated that more than one element may be activated to control the direction of the field. For instance, for transmission in the direction 604a, the element 602a may be activated. However, elements 602k and 602b may also be activated to achieve a directionalized field in the direction 604a. In fact, it has been found that the effective angular width of the field may be reduced using more than one element. This may also lead to a reduction in side lobe energy that may contribute to self-interference with the reception elements of the antenna.

Figure 7:
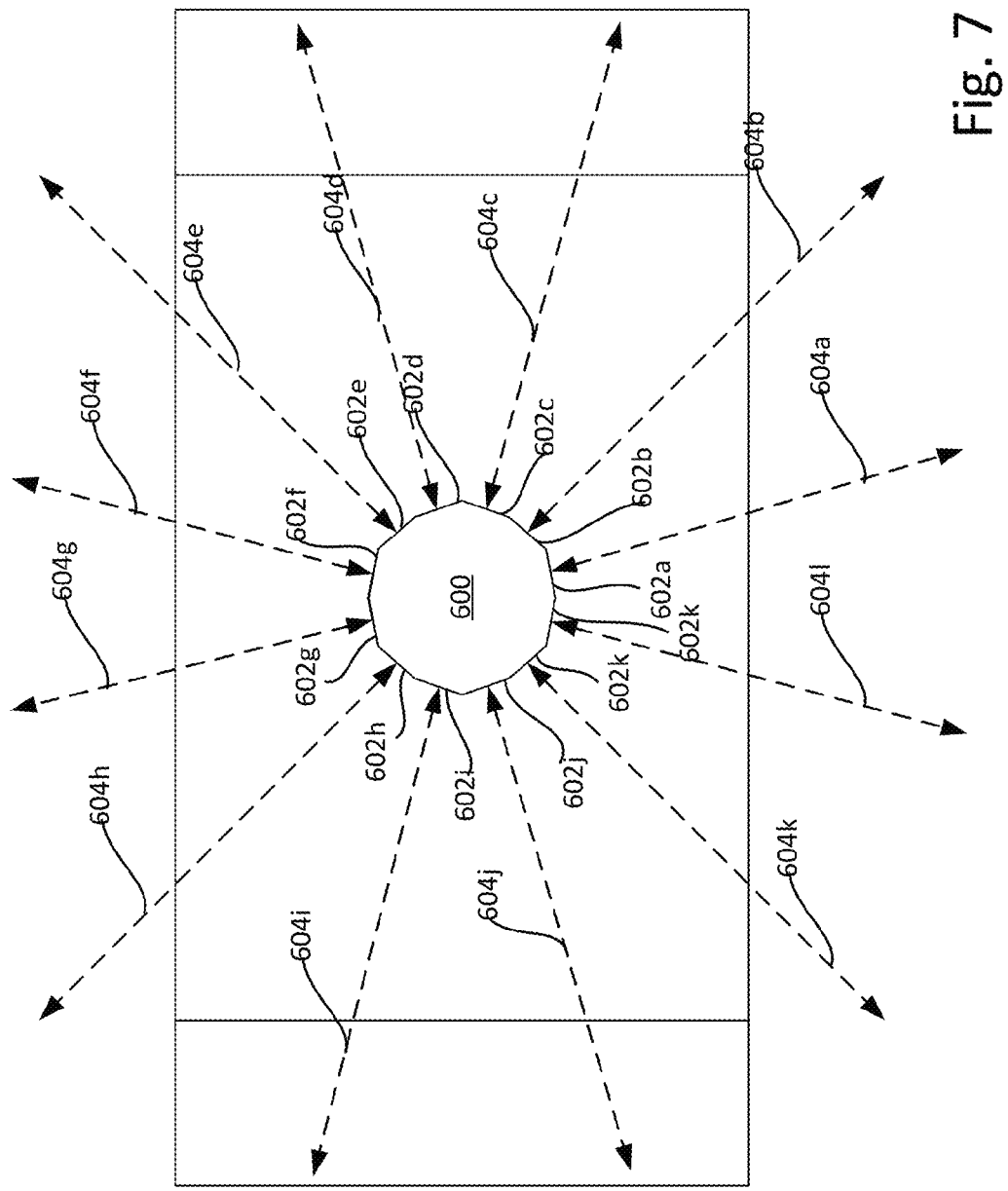
FIG. 7 depicts a top view of the embodiment of FIG. 6 with illustrated field pattern directions.

Furthermore, while the segmented antenna 600 is depicted in FIGS. 6 and 7 as being disposed externally to the chassis 301 on an antenna mast, it may be further appreciated that the segmented antenna 600 may be provided integrally with the chassis 301. That is, a chassis may be provided with integral segmented antenna portions having a geometric configuration generally according to the discussion of the antenna 600 described above. In such an instance, a data transfer module may include a chassis that may be elevated relative to the surface of the Earth and/or data acquisition modules from which the data transfer module receives seismic data as will be described in greater detail below. However, the general disclosure regarding the spacing and positioning of the segments 602 may be consistent. In this regard, the batteries 308/310 depicted in FIG. 6 may be provided in alternative configurations such that a perimeter of the chassis 301 is reserved for positioning of the discrete elements 602 about a perimeter of the chassis 301. For instance, the batteries 308/310 may be provided internally the chassis 301 and the discrete elements 602 may extend about an exterior perimeter of the chassis 301.

Figure 8:
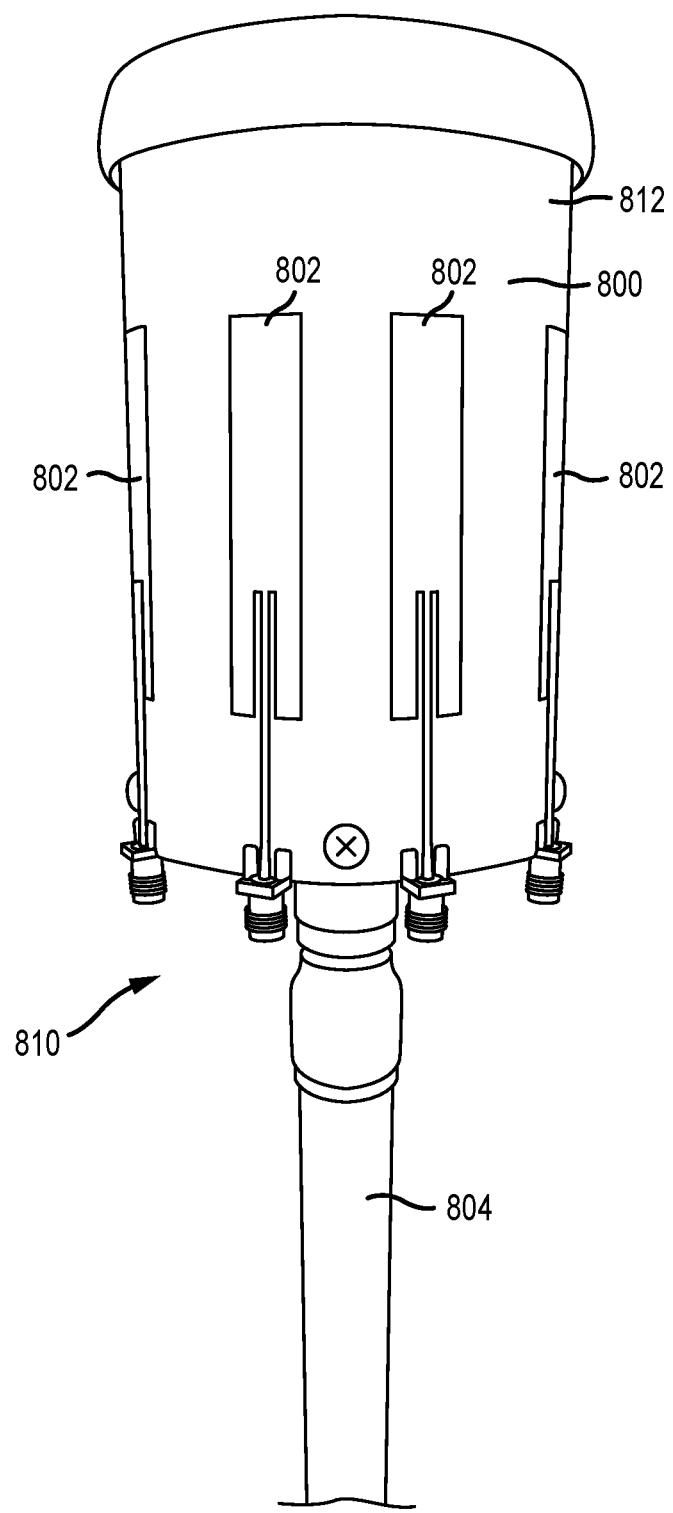
FIG. 8 depicts an embodiment of an antenna array mounted to a chassis via a mast.

Turning to FIG. 8, an antenna 800 having a plurality of elements 802 may be mounted to a mast 804 that is engaged with the module chassis 301. Specifically, the first end (not shown) of the mast 804 may be engaged with the chassis 301. In turn, the mast 804 may extend away from the chassis 301 such that a second end 810 of the mast 804 is disposed generally above the chassis 301. The second and 810 may include a cylindrical antenna support 812. In turn, the plurality of elements 802 may be disposed circumferentially about the perimeter of the cylindrical antenna support 812. In this regard, the plurality of elements 802 may provide directionalized radiation field patterns different perspective azimuth angle ranges relative to the antenna 800. Again, the discussion describing discrete antenna elements 802 in FIG. 8 may also apply to discrete antenna elements 802 that extend about a portion of a chassis 301. Moreover, it may be appreciated that a chassis 301 may be elevated above the surface of the Earth as described above.

Figure 9:
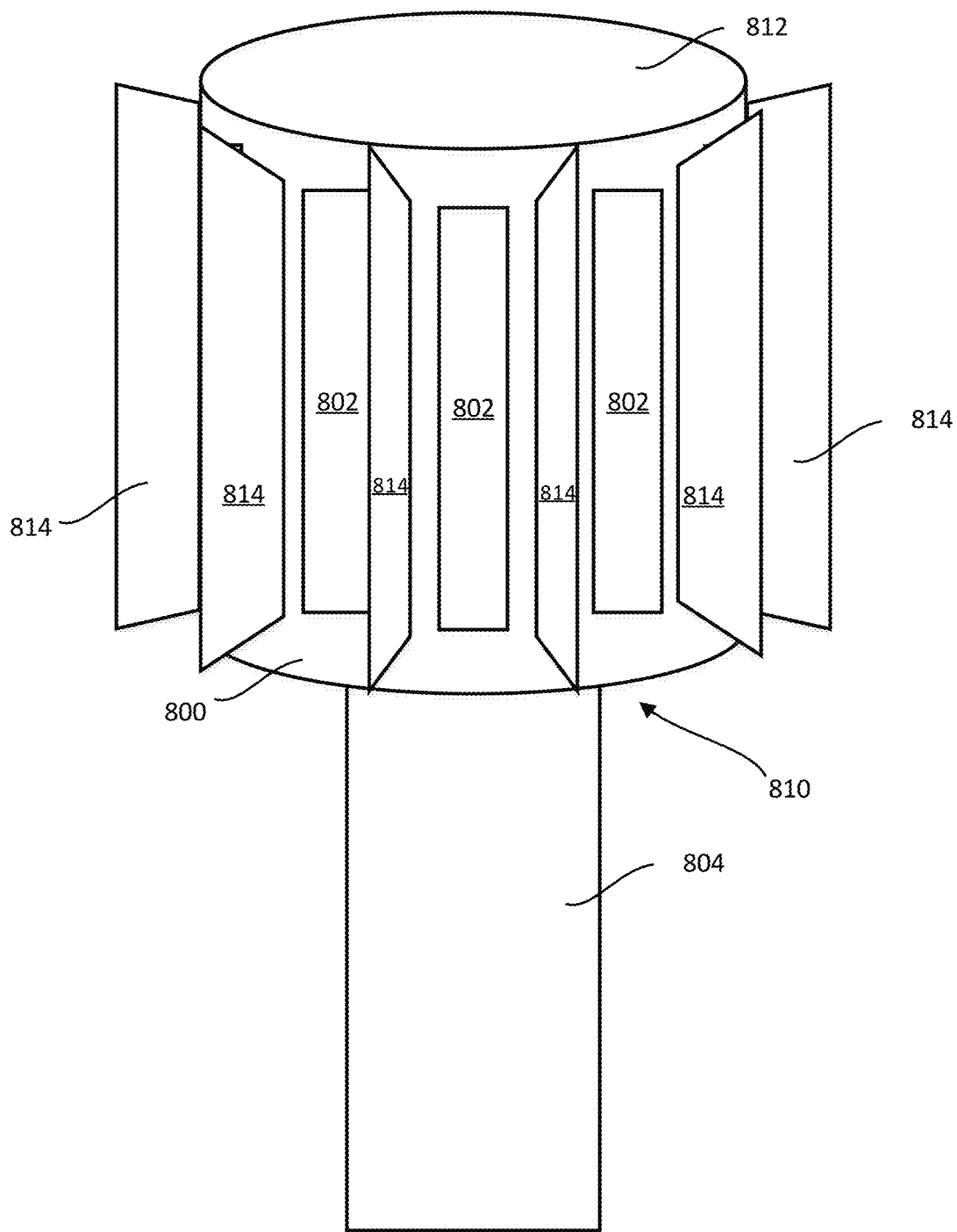
FIG. 9 depicts an embodiment of an antenna array having a plurality of waveguides disposed relative to discrete antenna elements.
Figure 10:
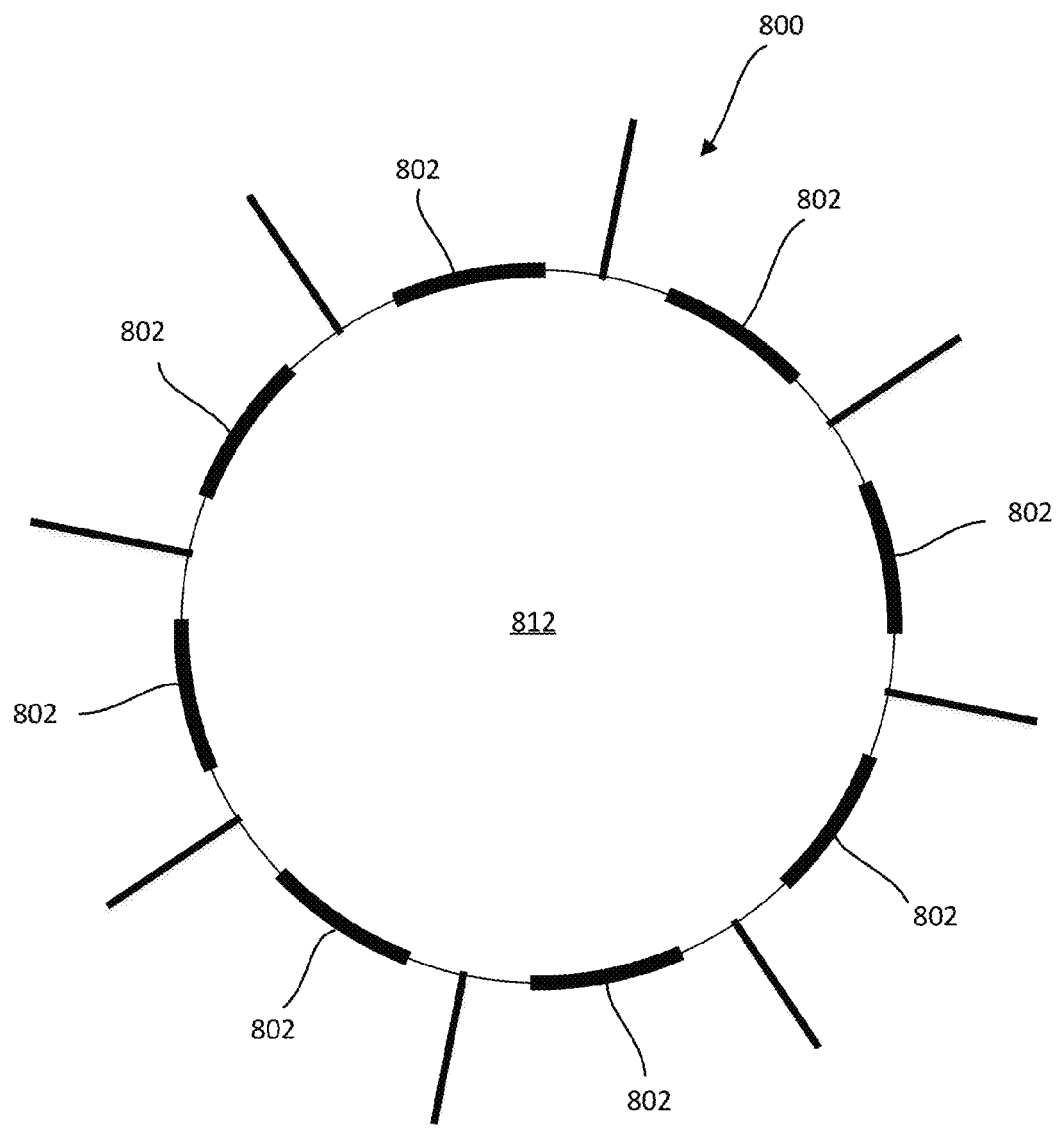
FIG. 10 depicts the embodiment of FIG. 9 in a top view.

With further reference to FIGS. 9 and 10, an embodiment of the antenna 800 may include waveguides that assist in limiting the azimuth angle range for a directionalized radiation field pattern for a given one of the elements 802. Specifically, fins 814 may be disposed about the cylindrical antenna support 812. The fins 814 may extend radially from the cylindrical antenna support 812 and generally be disposed between adjacent discrete antenna elements 802. The fins 814 may be made from a metallic or other material that is reflective of radiation at the corresponding frequencies utilized by the antenna 800. In this regard, the fins 814 may assist in directionalized and the radiation field pattern for a given one of the antenna elements 802. As such, the fins 814 may act as waveguides to assist in control of the direction of a given radiation field pattern for the antenna to a limited range of azimuth angles relative to the antenna 800. While the fins 814 that act as waveguides are described in relation to the cylindrical antenna support 812 disposed on a mast 804, it may be appreciated that similar structures may be provided in the case of a chassis with integral discrete antenna elements such that the fins 814 would extend within or exterior to the chassis with the integral discrete antenna elements to provide a similar waveguide structure as that described above.

Figure 11:
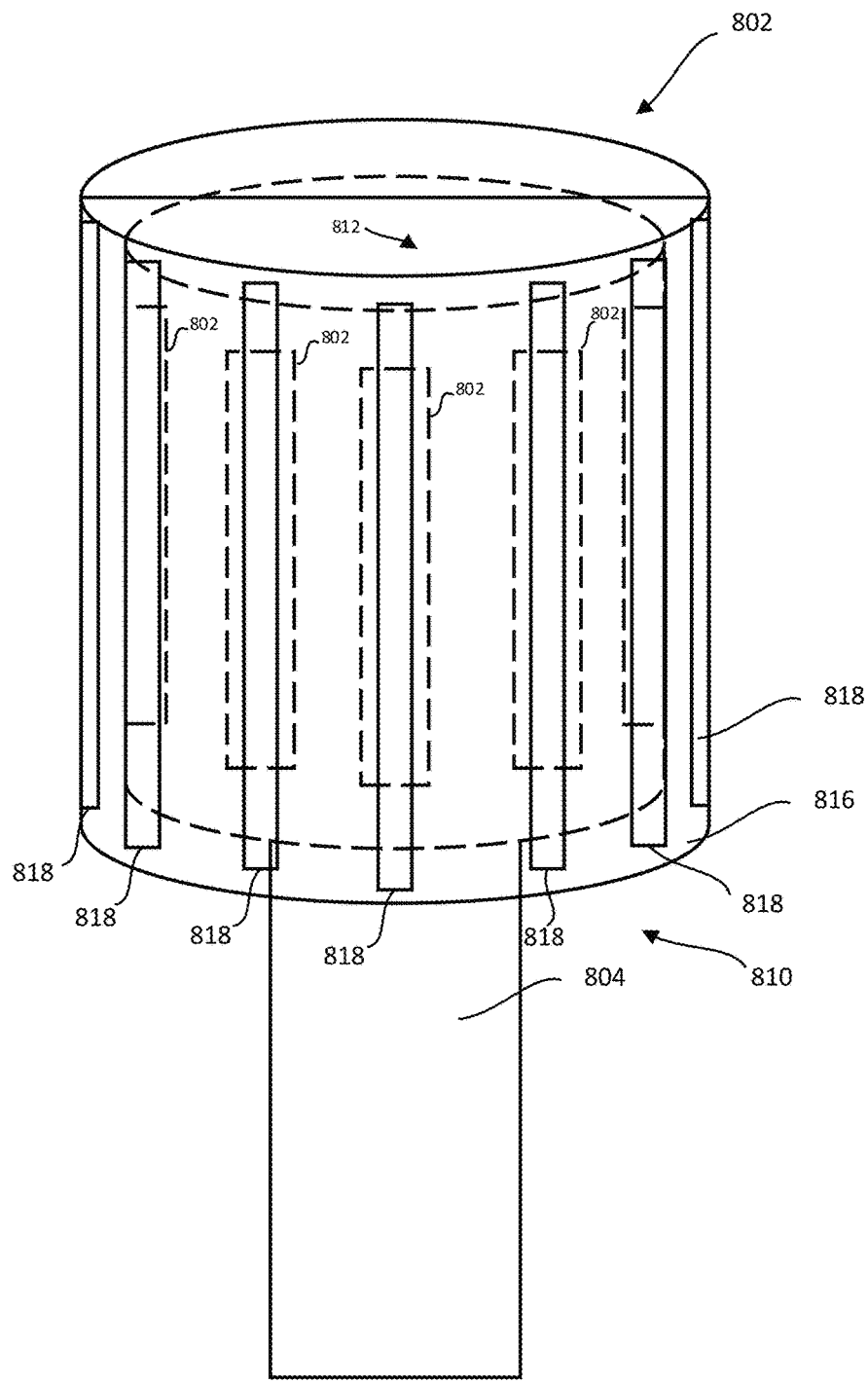
FIG. 11 depicts an embodiment of antenna array including a waveguide with radial slot apertures disposed relative to discrete antenna elements.
Figure 12:
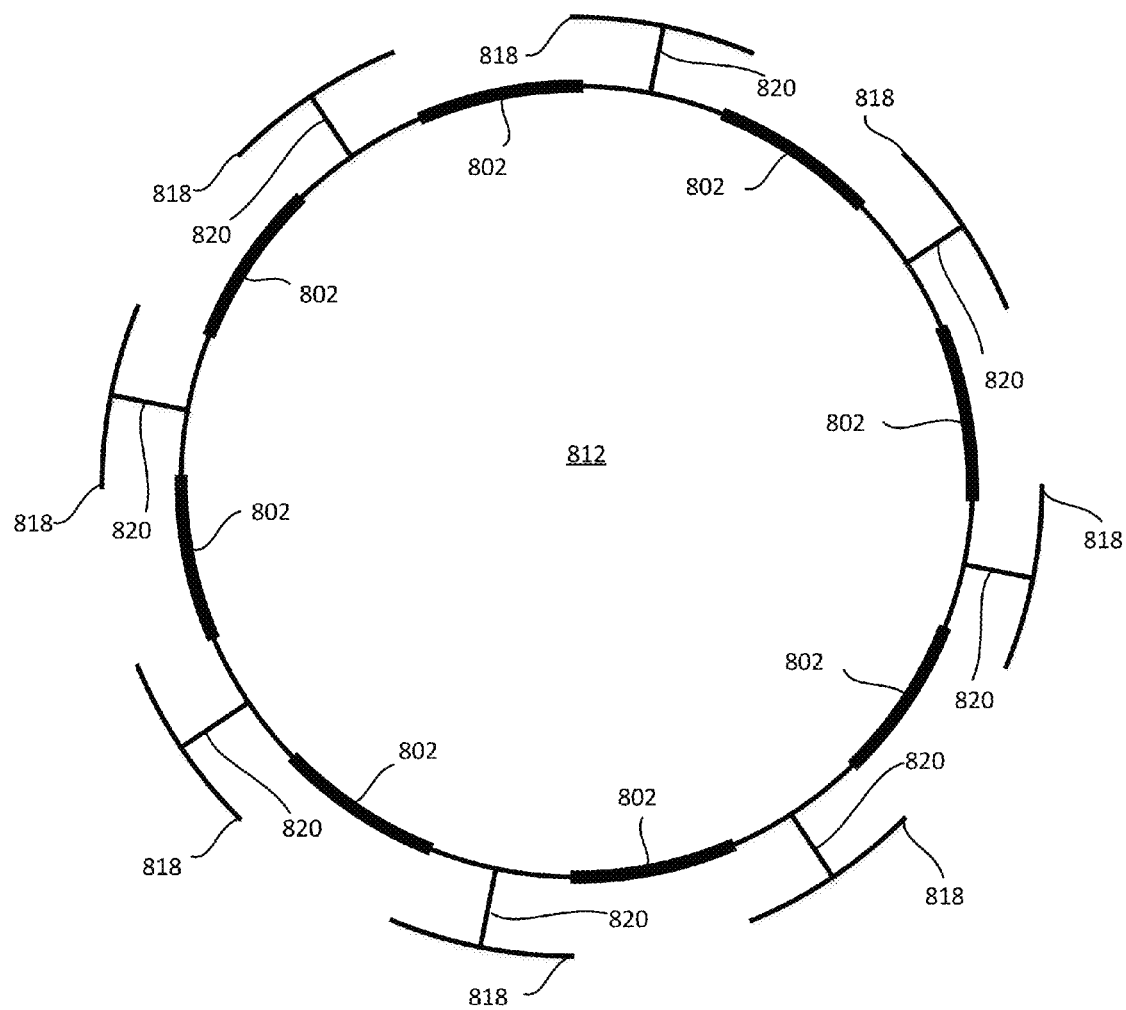
FIG. 12 depicts the embodiment of FIG. 11 in a top view.

FIGS. 11 and 12 depict another embodiment of a waveguide that may be utilized with an antenna 800. Specifically, the embodiment depicted in FIGS. 11 and 12 may include a shield member 816 that extends about the circumference of the cylindrical antenna support 812. The shield member 816 may be made from a metallic or other material that is opaque to radiation at the corresponding frequencies utilized by the antenna 800. The shield member 816 may include a plurality of apertures 818. The apertures 818 may generally extend parallel to a central axis of the cylindrical antenna support 812 and be aligned with corresponding discrete antenna elements 802. As best seen in FIG. 12, strut members 820 may extend from the cylindrical antenna support 812 to the shield 816. While a strut member 820 is shown being disposed between each respective antenna element 802, fewer struts 820 may be provided to maintain the shield 816 in place relative to the cylindrical support member 812. As the apertures 818 may generally be provided radially away from the antenna elements 802, the apertures 818 may serve to limit the azimuth angle range for the radiation field pattern for a given antenna element 802. Again, while the shield 816 having apertures 818 are described in the context of a cylindrical antenna support 812, a similar waveguide structure comprising a shield and apertures disposed relative to discrete antenna elements may also be provided in the case where discrete antenna elements are provided within a chassis.

Figure 13:
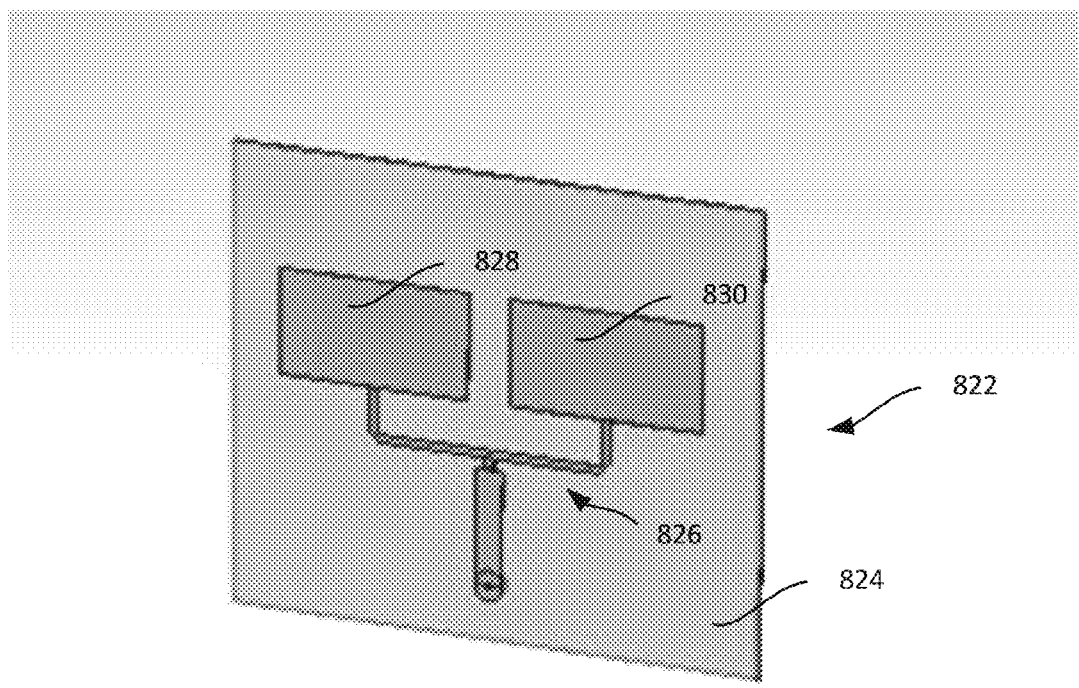
FIG. 13 depicts an embodiment of a discrete antenna element that may form a portion of an antenna array at a data transfer module.
Figure 14:
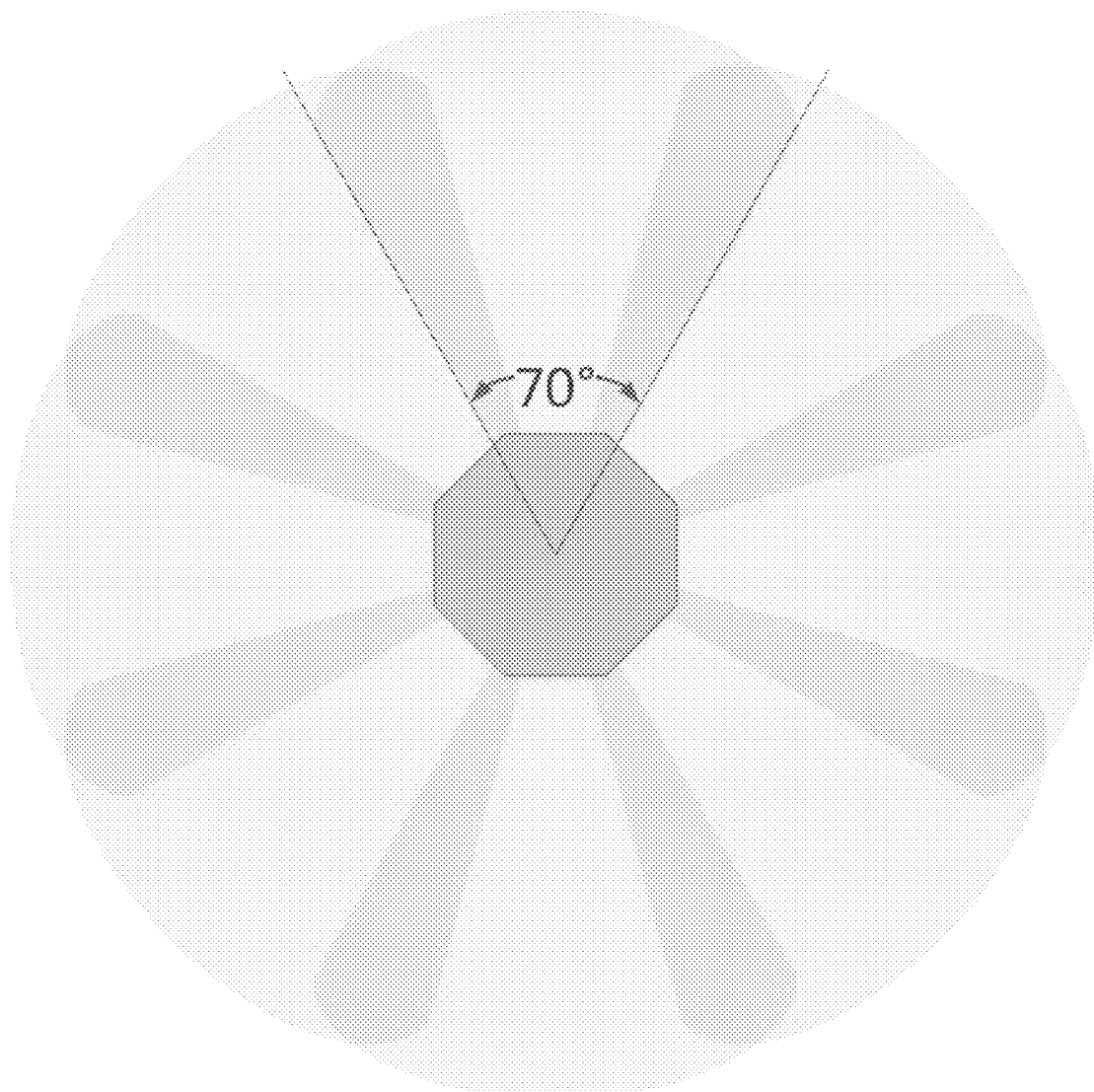
FIG. 14 depicts an embodiment of a top view of a data transfer module depicting limited radiation field direction to a range of azimuth angles relative to the data transfer module.

FIG. 13 depicts an embodiment of a discrete antenna element 822 the may be used in any of the various embodiments described herein. The discrete intent element 822 may include a substrate 824 such as a printed circuit board (PCB) substrate or the like. The substrate 824 may include metallic traces 826 deposited thereon. Specifically, the metallic traces 826 may include a first planar antenna surface 828 and a second planar antenna surface 830. The first and second planar antenna surfaces 828 and 830 may be simultaneously excited for transmission or reception of radiation from the discrete antenna element 822. Specifically, it has been found that the planar antenna surfaces 828 and 830, when arranged in a side-by-side fashion may improve widening of the vertical beam width and narrowing of the horizontal beam width. The vertical beam with may correspond to a range of polar angles $\theta$ as shown in FIG. 5. The horizontal beam width may correspond to a range of azimuth angles $\psi$ as shown in FIG. 5. Specifically, the azimuth angles $\psi$ may correspond to a range of angles relative to the horizon of the Earth when the data transfer module is disposed at or adjacent to the surface of the Earth. Accordingly, the planar antenna surfaces 828 and 830 may be arranged horizontally for such specific narrowing of the horizontal or azimuth angle of the resulting radiation field pattern and expansion of the vertical or polar angle of the resulting radiation field pattern. With further reference to FIG. 14, the horizontal or azimuth angle of the radiation field pattern may be, and at least embodiment, 70° or narrower. This may allow for sufficient targeting of adjacent data transfer modules in the horizontal direction.

Figure 15:
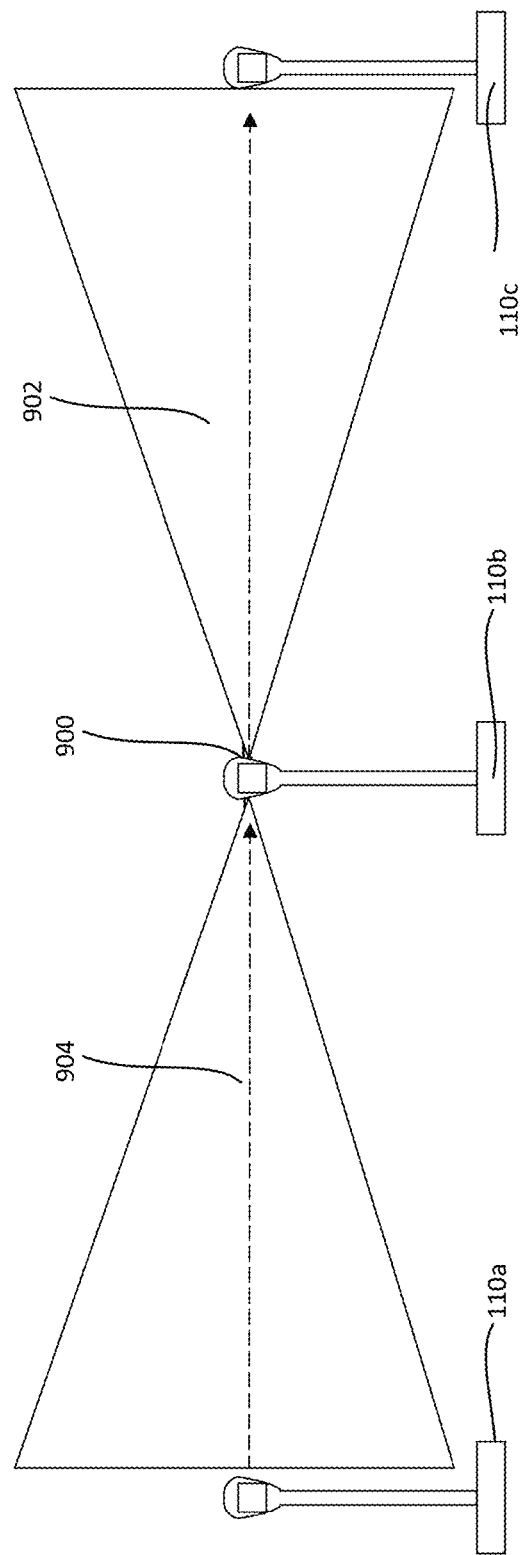
FIG. 15 depicts a side view of a portion of a serial data transfer path in a seismic array.
Figure 16:
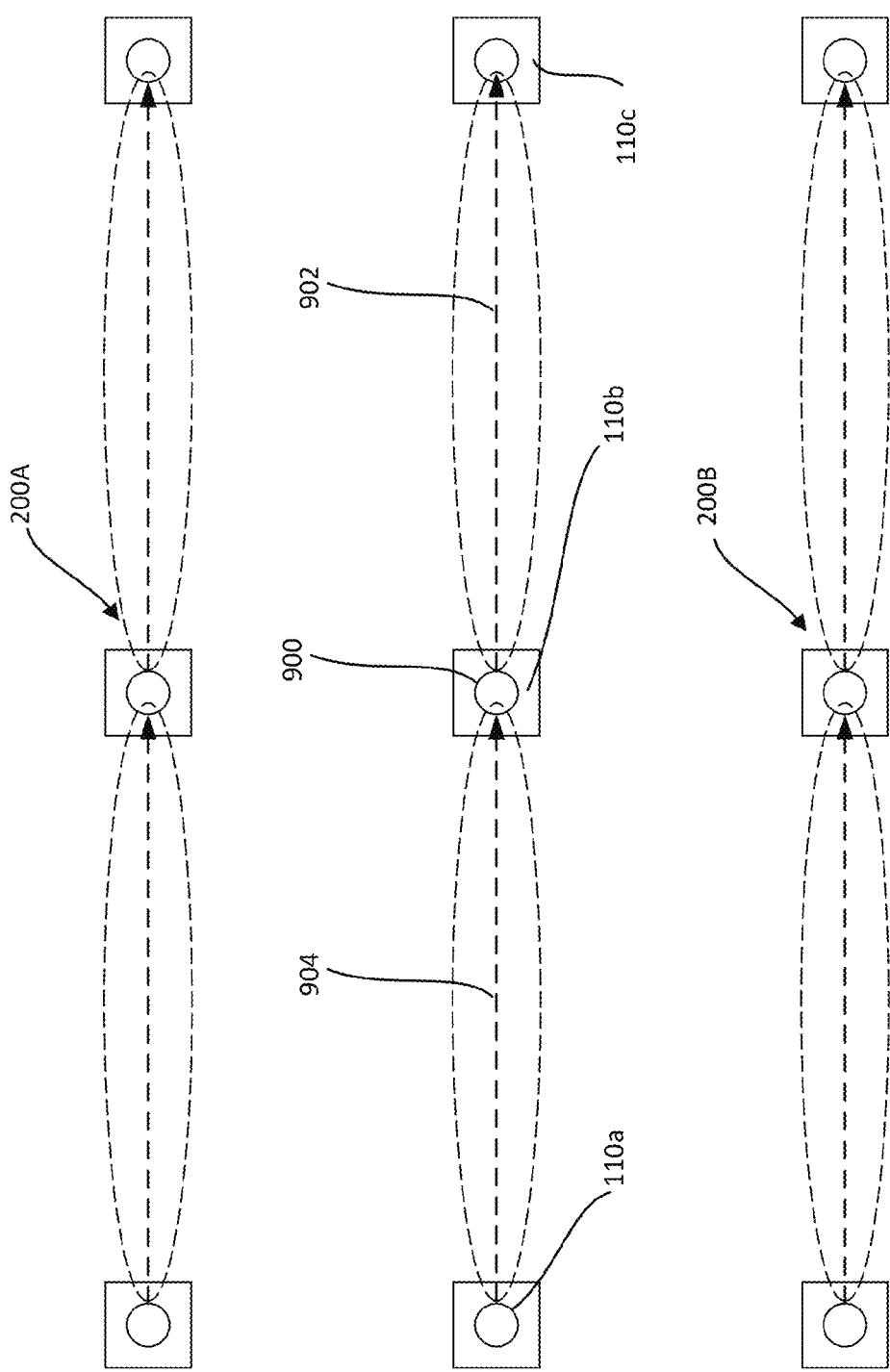
FIG. 16 depicts a top view of a portion of a serial data transfer path in a seismic array.

With reference to FIGS. 15 and 16, a portion of a seismic data transfer path is depicted. The portion depicted includes three modules 110a, 110b, and 110c. This discussion focuses on module 110b, however it should be understood this discussion could be extrapolated for any one of the modules 110a or 110c or any other module in a data transmission path. That is, 110a and 110c may operate identically to module 110b although not specifically discussed herein.

Module 110b may have a directionalized antenna 900. As can be appreciated, two RF directionalized radiation fields 902 and 904 are shown in relation to the module 110b. As may be appreciated the first directionalized radiation field 902 may correspond to a direction of transmission of data as best appreciated in FIG. 16, which shows a top view of the modules. The second directionalized radiation field 904 may correspond to a direction of reception sensitivity as best seen in FIG. 16. In this regard, as described above, the directionalized antenna 900 may be configured to receive signals from the direction of the directionalized radiation field 904 and transmit signals in the directionalized radiation field 902. As may be appreciated, the direction of the directionalized radiation field 902 may be substantially opposite to the directionalized radiation field 904. By substantially opposite, it is meant that the fields generally are directed 180° apart (e.g., within +/−20°). In this regard, the modules 110a, 110b, and 110c may be arranged generally linearly in an array. That is, the three modules may be aligned in a row of a survey as is often the arrangement of such modules. In turn, module 110b may receive data from module 110a at the same time module 110b transmits data to module 110c.

As can further be appreciated in FIG. 14, the modules 110a, 110b, and 110c may be arranged in an array with adjacent lines of modules 200a and 200b that may be operating in a similar manner as the described modules 110a, 110b, and 110c. As the directionalized fields 902 and 904 are generally arranged to be parallel and in opposite directions, the radiation fields generated and/or monitored by the directionalized radiation fields 902 and 904 may be aligned with the serial data transfer path of the modules 110a, 110b, and 110c. That is, interference with the adjacent lines 200a and 200b may be avoided or reduced by virtue of the geometry of the radiation fields.

Figure 17:
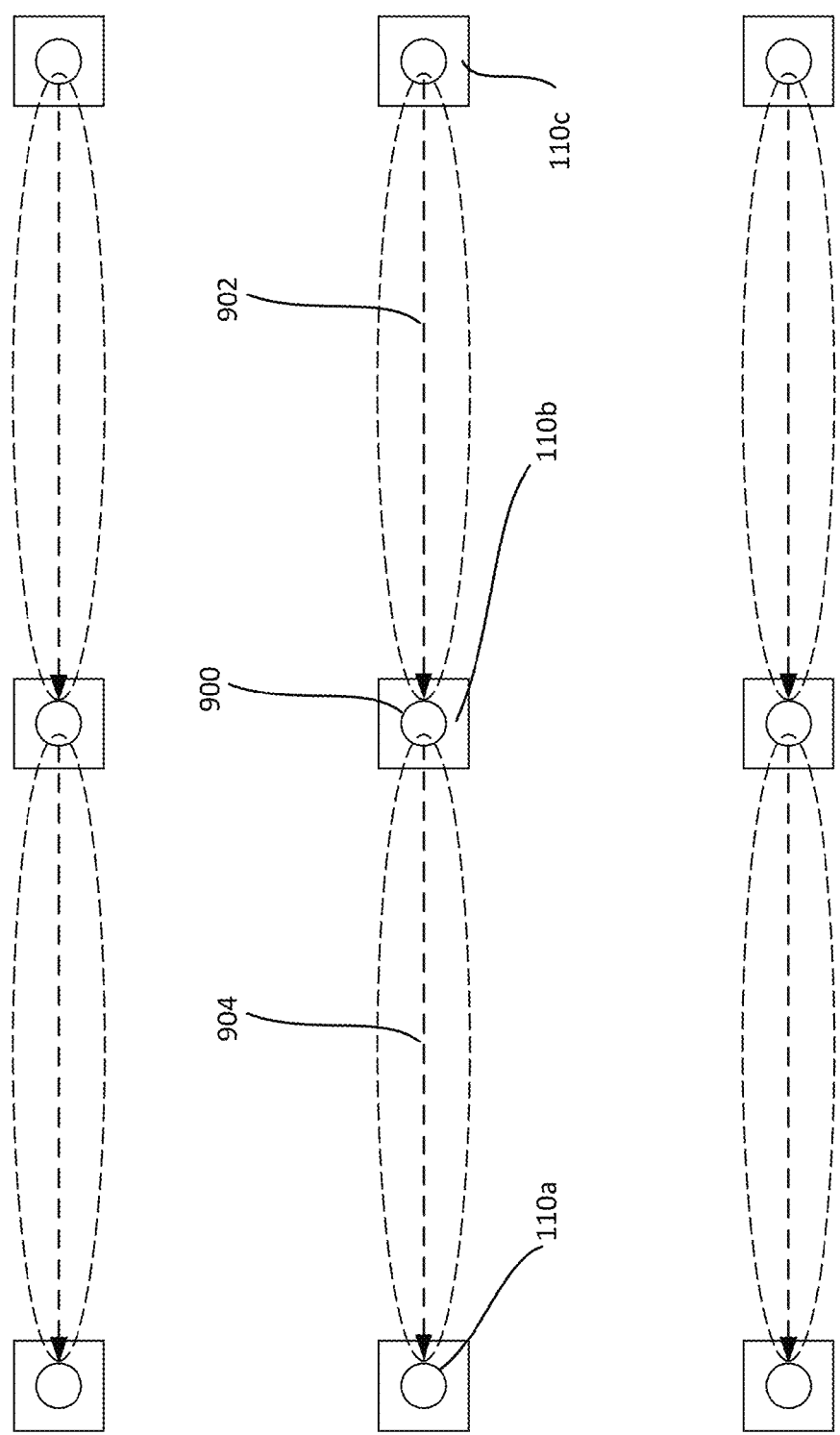
FIG. 17 depicts a top view of a portion of a serial data transfer path in a seismic array having the direction of data transmission reversed to that shown in FIGS. 15 and 16.

Furthermore, as shown in FIG. 17, the direction of the fields 902 and 904 may be reversed such that directionalized radiation field 902 comprises a directionalized sensitivity for reception of signals and directionalized radiation field 904 corresponds with a transmission field. This may be valuable to transmit administrative data upstream in the array. That is, when operating as shown in FIG. 16, the modules 110a, 110b, and 110c may coordinate to transmit data from module 110a toward module 110c which may be in a direction toward a central recording unit, or downstream, for recording of the data. However, administrative data (e.g., timing synchronization data, command data, etc.) may be required to be propagated upstream among the array. As such, the directionalized antenna 900 may be controlled to reverse the radiation field arrangement of FIG. 16 to that shown in FIG. 17 to allow for upstream transfer of data. This switching may occur periodically. It may be understood that in a seismic array, the data transfer requirement is predominantly asymmetrical in the downstream direction. As such, the upstream configuration show in FIG. 17 may be provided for as a third the duration, a quarter the duration, a fifth the duration, a tenth the duration, or even one hundredth the duration or less of the downstream transfer configuration depicted in FIG. 16.

In the arrangement depicted in FIGS. 15, 16 and 17, the modules 110 may comprise seismic acquisition devices. That is, the modules 110 may comprise a geophone, accelerometer, or other seismic acquisition device capable of acquiring seismic data directly. Such a geophone or other seismic sensor may be provided integrally to a chassis of the module or may be provided via an external geophone local to and in operative communication with the module. In this regard, the modules 110 may be operative to transmit the seismic data collected locally at the module 110 along with seismic data received from upstream modules.

Figure 18:
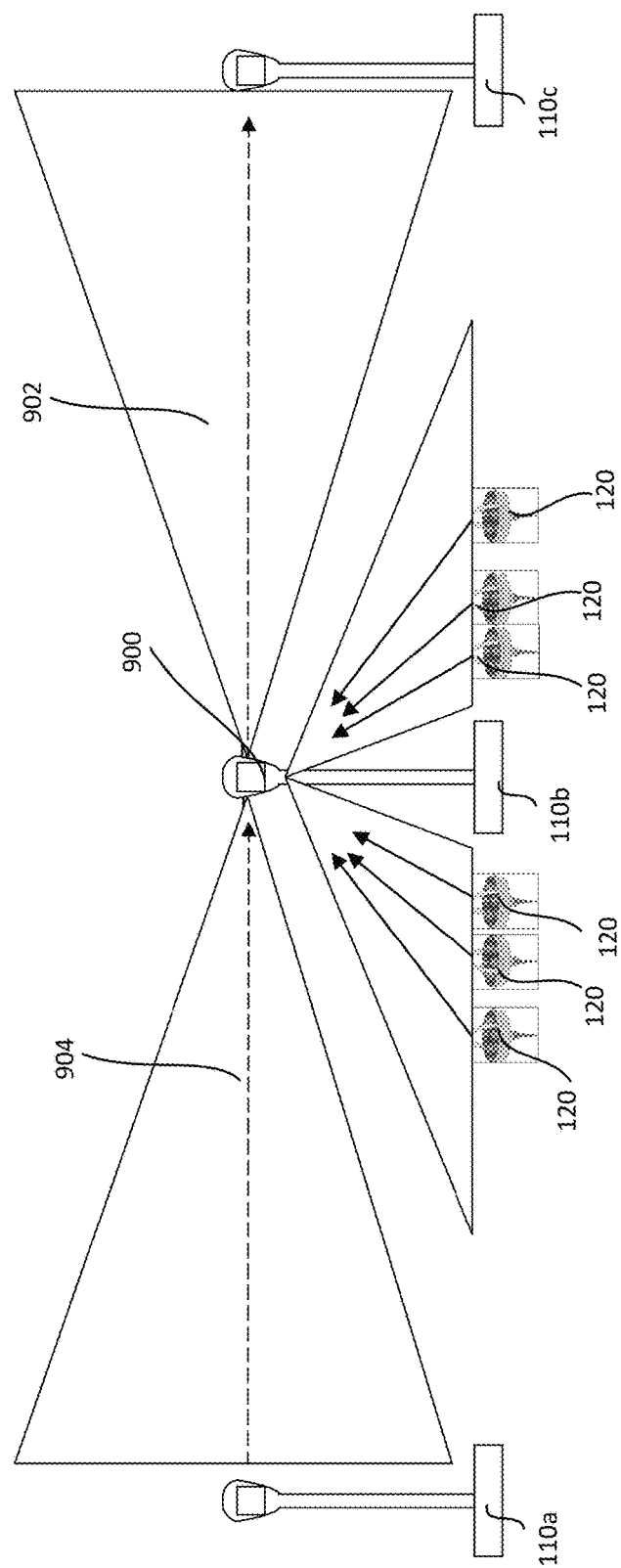
FIG. 18 depicts a side view of a portion of a serial data transfer path in a seismic array having seismic acquisition modules separate from the data transfer module such that the data transfer module comprises a concentrator unit for relay of the seismic data in the array.
Figure 19:
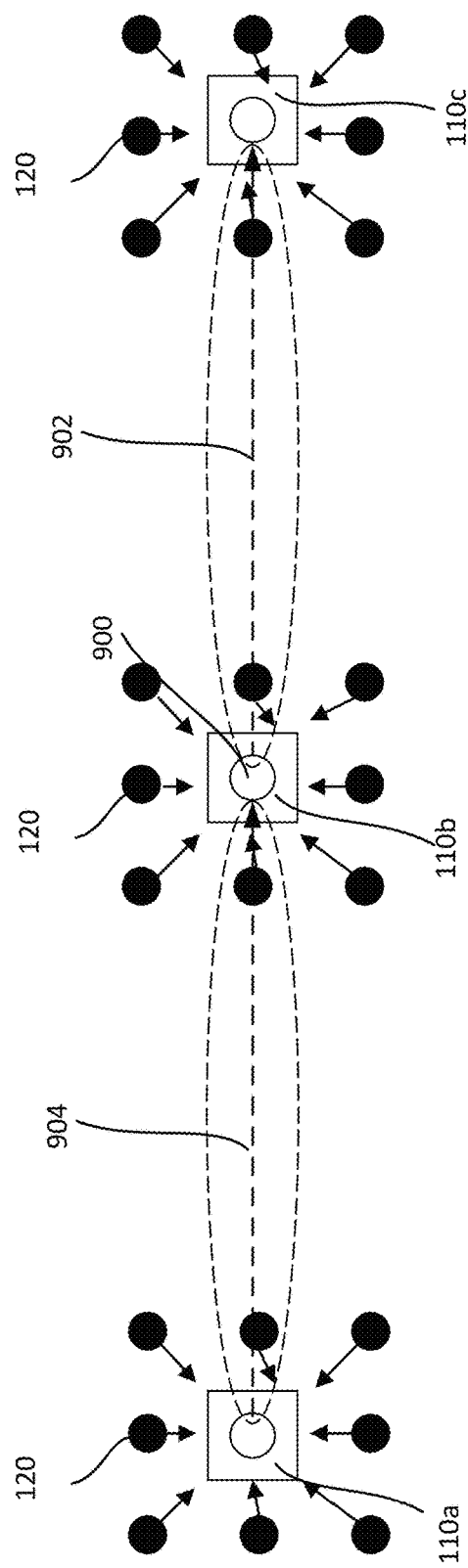
FIG. 19 depicts a top view of a portion of a serial data transfer path in a seismic array having seismic acquisition modules separate from the data transfer module such that the data transfer module comprises a concentrator unit for relay of the seismic data in the array.

In another embodiment depicted in FIGS. 18 and 19, the modules 110 may lack data acquisition capabilities. For instance, in FIGS. 18 and 19 an embodiment is depicted where the modules 110 may comprise concentrator modules that lack any local seismic sensor such as a geophone or the like. Rather, the modules 110 depicted in the embodiment in FIG. 18 may be in wireless communication with a plurality of acquisition devices 120. The acquisition devices 120 may comprise a geophone or the like to acquire seismic data. In turn, the acquisition devices 120 may transmit seismic data to the module 110b, which may act as a concentrator. In turn, the module 110 may transmit the seismic data it receives from the acquisition modules 120 to module 110c (which itself may be a concentrator in communication with a plurality of acquisition devices 120). Similarly, module 110a may be a concentrator in communication with a plurality of acquisition modules 120 and provide the data from the acquisition modules to module 110b via the directionalized field 904. U.S. patent application Ser. No. 14/699,940 is incorporated by reference herein in its entirety and generally depicts a hierarchical acquisition technique any and all of which may be utilized in conjunction with the disclosure provided herein.

It may be appreciated that communication with the acquisition modules 120 may be facilitated by the directionalized antenna 900. For instance, the directionalized antenna 900 may be controlled to receive transmission from the directionalized antenna 900. This may be done simultaneously with receipt and/or transmission via directionalized fields 902 and 904. For instance, in addition to simultaneous transmission and reception using different elements in different directions relative to the azimuth direction, the polar direction of the transmission fields (Θ) may similarly be controlled and/or provided independently for communication with the acquisition modules 120 at the same time as transmission and reception via the radiation fields 904 and 902. Alternatively, communication with the acquisition modules 120 may be during a different time period than the transmission and/or reception via the directionalized fields 902 and 904.

Further still, a separate antenna and radio (e.g., possibly using a distinct radio modality) may be provided for communication with the acquisition modules 120. For example, in certain embodiments a separate, second radio may be provided for communication between the data transfer module 110b and the acquisition modules 120. The second radio may be provided in addition to the first radio that utilizes the directionalized antenna 900 for communication between data transfer modules 110. Each of the data transfer modules 110 may include such a first radio for directionalized communication between the modules 110 as described herein as well as the second radio for communication with the acquisition modules 120. For instance, this radio may employ a TDMA protocol for communication with the acquisition modules 120, however other radio protocols may be utilized without limitation.

Figure 20:
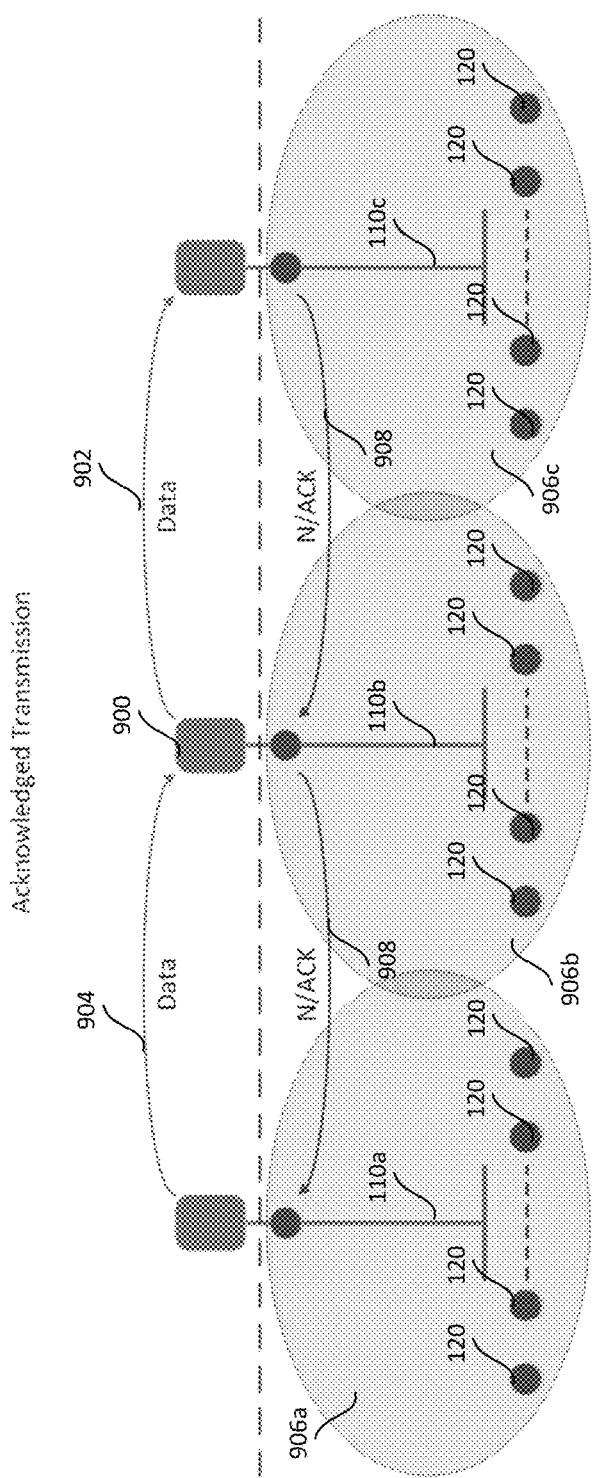
FIG. 20 depicts an embodiment of a serial data transfer path comprising a plurality of data transfer modules that utilize directionalized radio for communication of seismic data along the serial data transfer path and a second radio for communication with data acquisition modules separate from the data transfer module and for communication of administrative messages in the serial data transfer path.

Further still, the second radio may be utilized for transmission of administrative data between the data transfer modules 110. For example, in one embodiment, the first radio employing the directionalized antenna 900 may be utilized as described above to provide simultaneous receipt and transmission of seismic data among the data transfer modules 110 utilizing the directionalized fields 904 and 902. With further reference to FIG. 20, the second radios 906 of the various data transfer modules 110 may be used to communicate with the various acquisition modules 120 in communication with each given data transfer module 110. In addition to use of the second radios 906 for communication with the acquisition modules 120, the second radios 906 may be used to communicate administrative data between the data transfer modules 110. As depicted, seismic data is transmitted over the first radio utilizing the directionalized antenna 900 while acknowledgment or confirmation signals may be provided among the data transfer modules 110 using the second radio 906. As may be appreciated, the acknowledgment signals may be much smaller in size than the seismic data transmitted using the first radio. Specifically, such acknowledgment signals may include acknowledgment of receipt of various packets of seismic data transmitted on the first radio. In turn, requests for retransmission of seismic data packets on the first radio that were not received a downstream data transfer module may be requested using the second radio 906. Accordingly, use the second radio 906 may allow for full use of the first radio in transmitting seismic data and allowing the administrative data in the form of the acknowledgment signals to be propagated up a serial data transfer line using the second radio 906.

Further still, the second radio 906 may be utilized for other administrative functions such as module discovery and array configuration. Specifically, beaconing signals for discovery of adjacent modules may be transmitted on the second radio 906. For example, the second radio 906 may utilize omnidirectional transmission and reception fields for the discovery and organization of data transfer modules within the array. Furthermore, information regarding the relative directions between data transfer modules can be exchanged between adjacent data transmission modules utilizing the second radio 906 to target the directionalized transmission and reception radiation field patterns for the directionalized antenna of adjacent modules. Such discovery and organization may occur during deployment of the data transfer modules such that the second radio 906 is used for initial array configuration. Alternatively, reconfiguration of deployed data transfer modules may also be facilitated by way of the second radio 906. In this regard, the second radio 906 may be utilized dynamically during the performance of a seismic survey to, for example, reconfigure serial data transfer lines and or reception and transmission pairs among the data transfer modules. This may facilitate skip healing or other techniques to account for malfunctioning modules or the like.

As briefly mentioned above, in addition to the direction of transmission or reception, different radio modes may be employed for communications between modules. For example, the directionalized reception field 904 may be tuned to receive data at a different frequency than the frequency at which data is transmitted in the directionalized transmission field 902. In this regard, further isolation between transmitted data and received data may be provided to further facilitate discrimination of the received signals from transmitted signals. Furthermore, the use of frequencies may be selected so as to reduce any potential interference between lines of modules. Other means of isolation may be utilized as well. For instance, the transmit and receive signals may be circularly polarized. In this regard, different circular polarizations may be provided between the transmit and receive fields to further promote isolation. Furthermore, different modulation approaches may be utilized to achieve greater isolation between the transmit and reception fields.

These approaches to signal isolation may also be applied in relation to a system as described above where modules transmit data along the serial data transfer path and receive data by way of wireless communication from a mote. For instance, communications between the motes and a concentrator module may be circularly polarized in a given direction while communication between, the concentrator module and another module may be circularly polarized in the opposite direction. In turn, approaches that combine frequency allocation and polarization direction may be used to further simply frequency management among the modules. Furthermore, other approaches such as direct sequence spread spectrum (DSSS) approaches may be used for communication between the motes and a concentrator. In turn, a relatively robust modulation scheme may be employed that beneficially reduces the interference with communication of the mote in the serial data transfer path.

Still further, different modulation techniques may be employed at different positions in a single given serial data transfer path based on conditions or characteristics at a given module. For instance, modules near the terminal end of the line (i.e., away from the central record unit) may be required to transfer relatively little data in comparison to modules near the line interrupt unit. This may be because data is aggregated or collected along the line such that a module near the line interrupt unit may be transmitting data from most, if not all, other modules in the line, whereas the data at the terminal end of the line may have relatively few modules' data to transmit. As such, a portion of the line (e.g., near the terminal end where bandwidth requirements are less than near the line interrupt) may use a relatively simple, robust modulation scheme that sacrifices bandwidth for lower error rates. For example, at a terminal portion of the line, a binary phase-shift keying (BPSK) approach may be utilized that has relatively low bandwidth and a relatively low error rate. Elsewhere in the line, where bandwidth requirements are increased, other modulation techniques (e.g., quadrature amplitude modulation (QAM) may be used such as 16 QAM, 64 QAM, or even higher orders of QAM). Further still, any number of multiples of modulation techniques may be used along the lines (e.g., based on the local requirements of a module). Examples may include any amplitude-shift keying, phase-shift keying, amplitude and phase-shift keying, frequency modulation, or any other digital modulation technique known.

Figure 21:
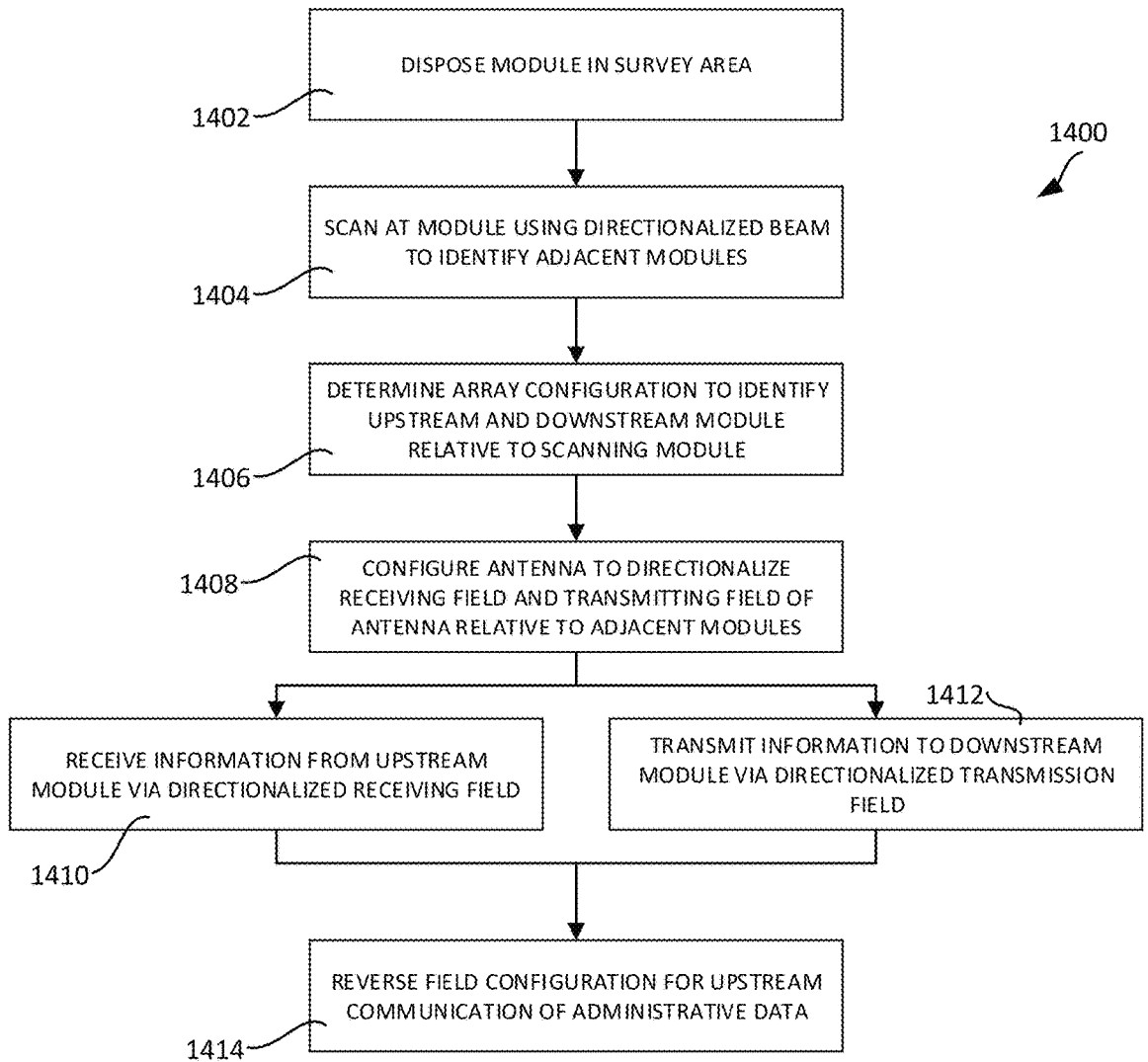
FIG. 21 illustrates an embodiment of a method of operation of a data transfer module in a seismic array for simultaneous directionalized transmission and reception of data.

With additional reference to FIG. 21, a method 1400 is illustrated for operation of a module as described herein. The method 1400 may provide significant advantages in relation to deployment of a module into a survey area. Specifically, often seismic surveys are deployed into a relatively large area and rely on a large number of modules. As such, often relatively unskilled labor is utilized to deploy the modules. As a result, delicate, complex, or time consuming set up procedures are prohibitive.

However, utilization of a directionalized antenna as described herein may alleviate complex set up considerations. For example, the method 400 includes disposing 1402 a module into the survey area. In this regard, the disposing 1402 may be as simple as placing the module on the ground at a location in the survey area. The location of at which the device is placed may be predetermined (e.g., by a survey crew or the like). In any regard, the individual placing the module may simply place the module at the predetermined location without regard to orientation of the module relative to any other modules in the array.

In turn, the method 1400 includes scanning 1404 at the module using the directionalized antenna to identify adjacent modules. The scanning may include controlling the directionalized beam pattern of the module to broadcast a discovery signal and/or receive a discovery signal from an adjacent unit. In either instance, exchange of a discovery message may allow for identification of adjacent modules in the array. The method 1400 further includes determining 1406 an array configuration to identify an upstream and a downstream module relative to the scanning module. This may include receiving a module identifier from both modules and comparing to a restored reference table in memory at the module to identify an upstream and downstream module. Additionally or alternatively, one or both of the modules may self-identify as the upstream or downstream module.

Once the upstream and downstream modules have been identified, the method 1400 may include configuring 1408 the antenna so as to direct the reception field of the antenna toward the upstream module and the transmission field of the antenna toward the downstream module. This may include, based on the information received during the scanning, identifying one or more antenna elements directed toward the upstream module and configuring the identified antenna elements to receive RF energy. Similarly, based on the information received during the scanning, the configuring 1408 may include identifying one or more antenna elements directed toward the downstream module and configuring the identified antenna elements to transmit RF energy.

Accordingly, the method 1400 may also include receiving 1410 information at the one or more antenna elements configured for reception that are directed toward the upstream module. Simultaneously, the method 1400 may include transmitting 1412 information at the one or more antenna elements configured for transmission that are directed toward the downstream module. For instance, RF signals received from the upstream module may be detected at the one or more reception elements and provided to the processor and/or a transceiver or receiver at the module for processing of the data. The data may be stored at the module and/or provided to a transceiver or transmitter for transmission by the one or more antenna elements configured for transmission to the downstream module.

Also, as addressed above, it may be advantageous to, at least periodically, provide upstream communication in the array (i.e., in a direction away from the central recording unit). As such, the method 1400 may include reversing 1414 the directional field directions so that the transmission field is directed to an upstream module and the reception field is directed to a downstream module.

Figure 22:
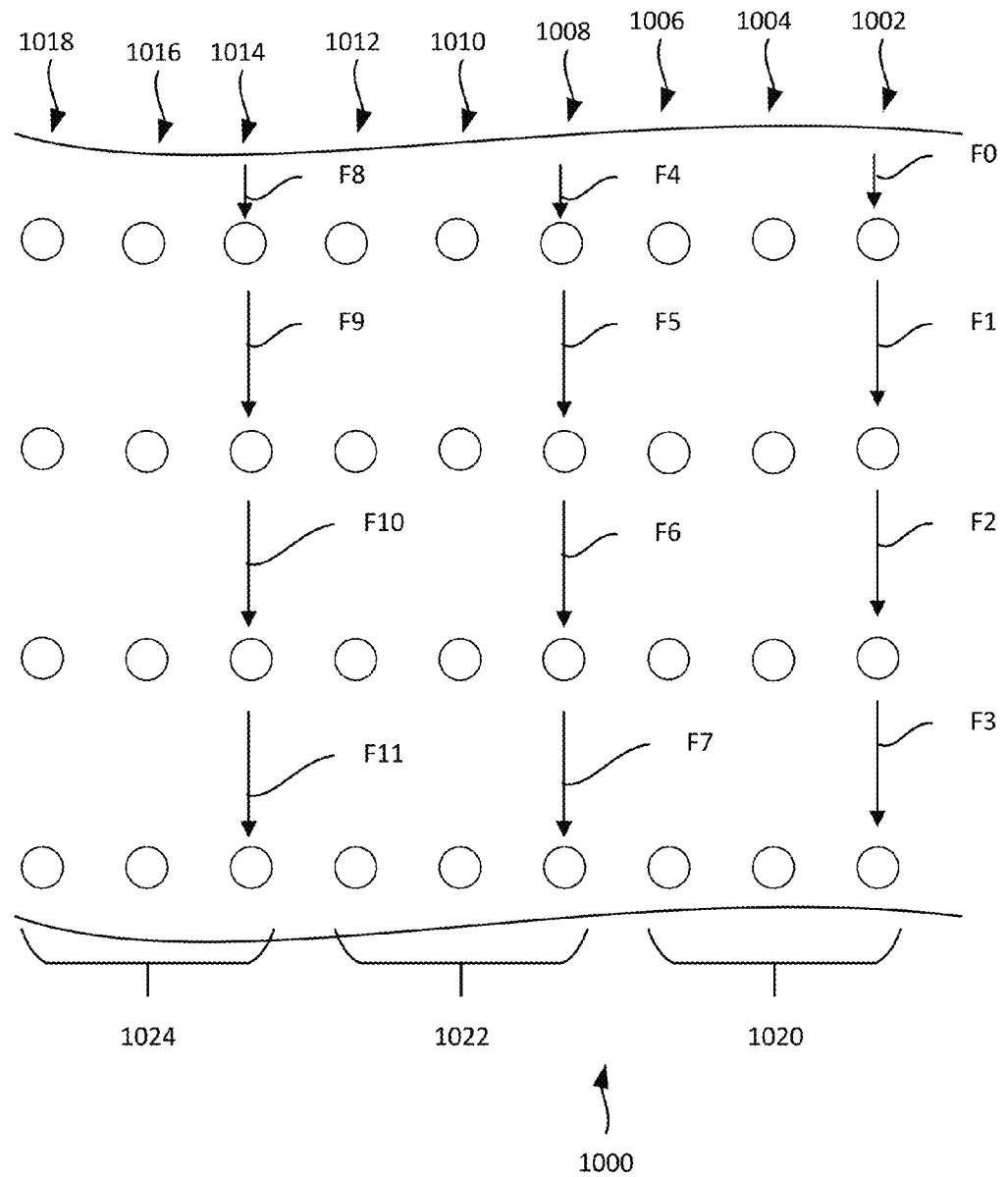
FIG. 22 illustrates an embodiment of a plurality of adjacent serial data transfer paths comprising lines of data transfer modules in a first time period.
Figure 23:
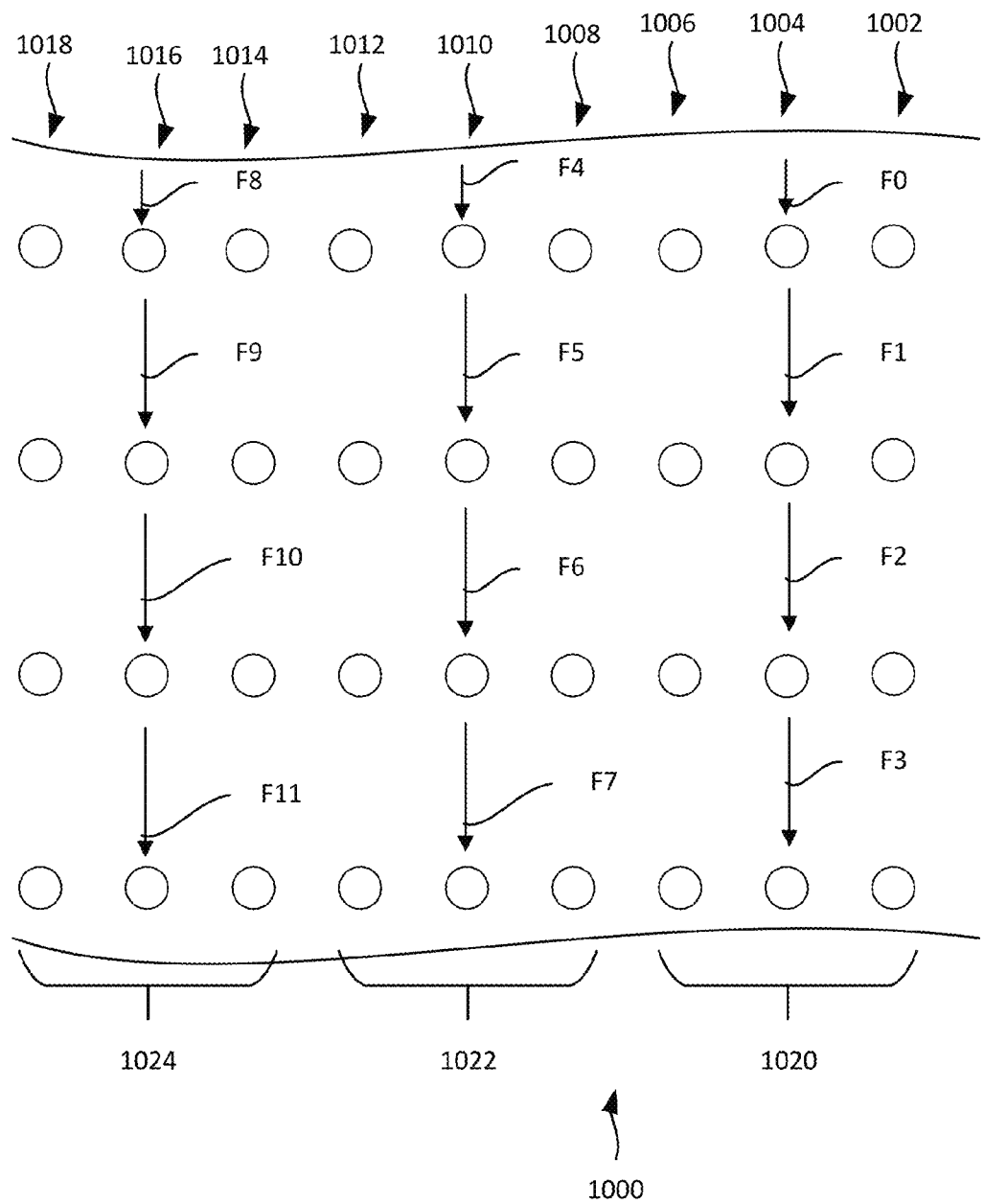
FIG. 23 illustrates the embodiment of the plurality of adjacent serial data transfer paths of FIG. 22 in a second time period.
Figure 24:
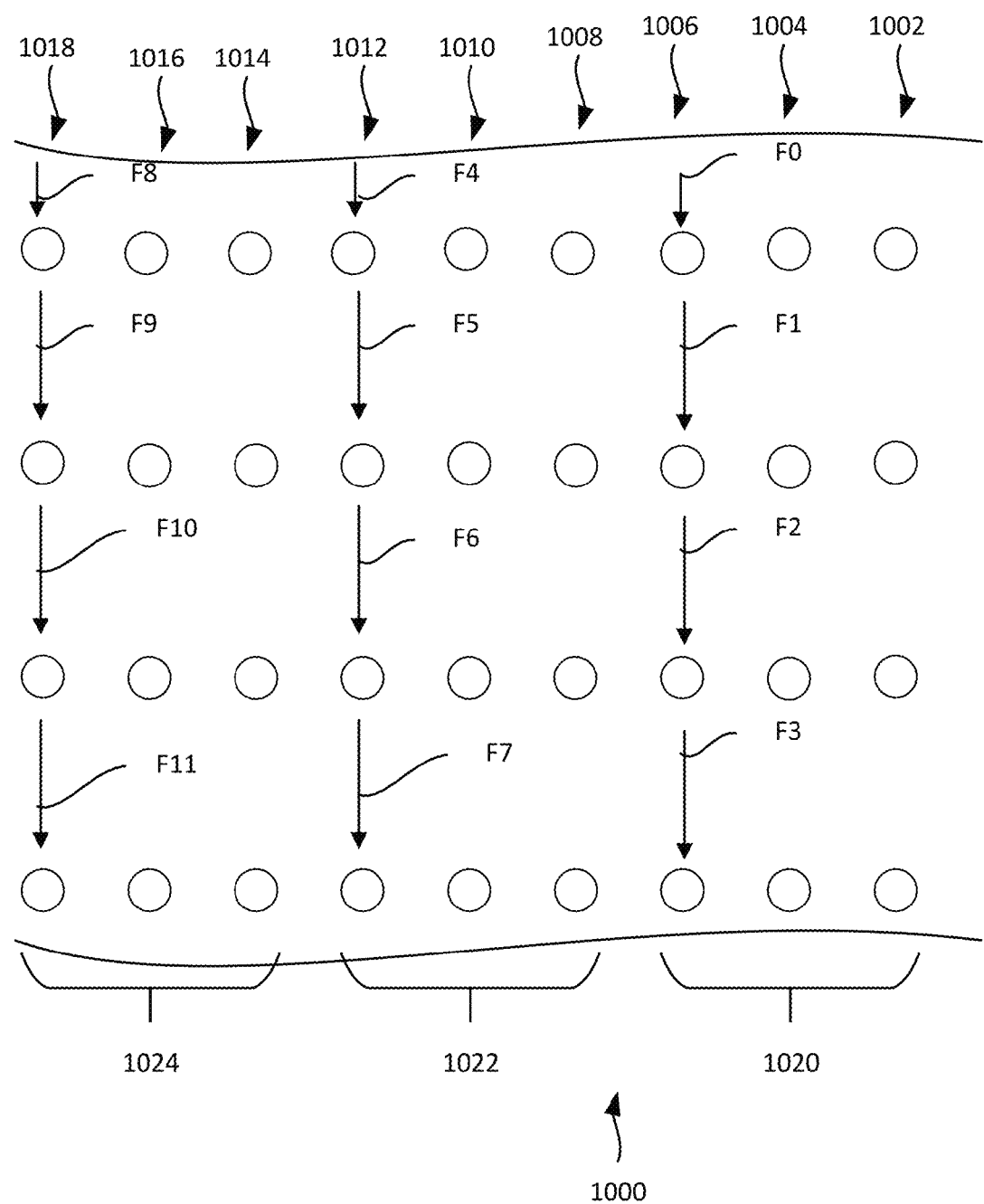
FIG. 24 illustrates the embodiment of the plurality of adjacent serial data transfer paths of FIG. 22 in a third time period.

Turning now to FIGS. 22-24, a portion 1000 of a seismic survey system is depicted. FIG. 22 corresponds with a first time period t0. FIG. 23 corresponds with a second time period t1. FIG. 24 corresponds the third time period t2. As will be appreciated in the discussion below, the configuration depicted in FIGS. 22-24 may generally relate to a technique referred to herein as dimensioning. This technique of dimensioning involves dividing a duty cycle of a given length of time into discrete periods during which respective portions (e.g., data transfer modules belonging to a given serial data transfer path) of the seismic survey system 1000 utilize a directionalized antenna configuration according to the foregoing disclosure to simultaneously transmit and receive seismic data along a serial data transfer path of data transfer modules. Using this technique, subsets of data transfer modules within the system 1000 may transmit seismic data during a given portion of the duty cycle and remain idle during other portions of the duty cycle. As will be discussed in greater detail below, this technique may allow for more efficient use of unique radio characteristics (e.g., frequencies) to assist in reduction of interference within the survey system 1000. Furthermore, a technique of skip healing to detour radio transmissions around a malfunctioning module in a given serial data transfer path may also be facilitated using this technique.

Accordingly, with reference to FIGS. 22-24, a plurality of lines of data transfer modules are depicted. Each of the lines of data transfer modules may correspond to a serial data transfer path within the seismic survey system 1000. Specifically, a first line 1002, a second line 1004, and a third line 1006 may be grouped into a first group 1020. A fourth line 1008, a fifth line 1010, and a sixth line 1012 may be grouped into a second group 1022. A seventh line 1014, an eighth line 1016, and a ninth line 1018 may be grouped into a third group 1024. During the period T0 depicted in FIG. 22, the first line 1002 from the first group 1020, the fourth line 1008 from the second group 1022, and the seventh line 1014 from the third group 1024 may be active to relay seismic data among the data transfer modules of a given one of the lines as described above using directionalized antenna for simultaneous transmission and reception seismic data within a given serial data transfer path represented by one of the lines. During this time period depicted in FIG. 22, the other serial data transfer lines of the groups may be idle such that seismic data is not relayed among the serial data transfer paths of these other lines in the first time period T0. By idle, it is meant that these lines do not use simultaneous transmission and reception for relay of seismic data along the data transfer path for these idle lines. However, other activities such as communication with data acquisition modules, administrative communications, or other activities may still occur.

With further reference to FIG. 23, a second period of time T1 is depicted. During this time, the second line 1004 from the first group 1020, the fifth line 1010 from the second group 1022, and the eighth line 1016 from the third group 1024 may be active to relay seismic data along each respective serial data transfer path represented by a given line of data transfer modules. During this time, the other lines of the groups may be idle. With reference to FIG. 24, the third line 1006 from the first group 1020, the sixth line 10,012 from the second group 1022, and the ninth line 1018 from the third group 1024 may be active to relay seismic data along each respective serial data transfer path. During this time, the other lines of the groups may be idle.

Accordingly, for each respective period of time represented in respective ones of FIGS. 22-24, one-third of the represented serial data transfer lines may be active at any one time. In this regard, for a given duty cycle of the system 1000, three distinct time periods may be provided during which given ones of the data transmission lines from the groups of lines may be active. However, fewer or additional duty cycle periods may be provided such that each group may include more or less than three lines as depicted. For instance, if the duty cycle had four periods, the groups may each include four lines such that a given one of the lines is active in a corresponding duty cycle period. As such, the number of lines in a group may correspond with the number of duty cycle periods utilized.

One benefit of use of such a technique may be for more efficient use of radio characteristics for prevention of interference within the system 1000. For example, the provision of frequencies for the serial data transfer lines may be more efficiently provided in this technique. While frequencies are referred to below as the respective radio communication, it may be appreciated that other radio characteristics may be similarly control such as, for example, circular polarization, or other characteristics of radio signals that may be differentiated to prevent interference.

Specifically, with reference to FIG. 22, the first line 1002 may utilize frequencies F0, F1, F2, and F3 during the period of time depicted in FIG. 22. Similarly, the fourth line 1008 may utilize frequencies F4, F5, F6, and F7, and the sixth line 1014 may utilize frequencies F8, F9, F10, and F11. In this regard, for the 36 data transfer modules depicted in FIG. 22, 12 frequencies are utilized during the time period depicted. As may be appreciated, the idle lines may not utilize frequencies as the data transfer modules within the idle lines may not be actively communicating seismic data during this first time period. However, during the second time period depicted in FIG. 23, the frequencies described above may be utilized by the second line 1004, the fifth line 1010, and the eighth line 1016. That is, the frequencies allocated to the first group 1020, the second group 1022, and the third group 1024 may be utilized by each active line within the group during a corresponding duty cycle period. In turn, by splitting the duty cycle of the system 1000 into three distinct periods, one-third fewer frequencies may be required to operate the system benefit all modules transmitted data during all duty cycle periods. Moreover, greater spatial separation between lines using common radio characteristics may be provided. For example, in the embodiment depicted in FIG. 22, a tenth line (not shown) adjacent to the ninth line 1022 may reuse the radio characteristics of the first group. In this case, the lines reusing frequencies would be more spatially separated for a given number of available frequencies relative to a system that simultaneously used each adjacent line to transmit seismic data. Furthermore, it may be appreciated that utilizing duty cycle portions described herein may reduce energy consumption in that a given module may only be required to transmit data for one-third of the duty cycle rather than utilizing energy for relay of data during the entire duty cycle.

Figure 25:
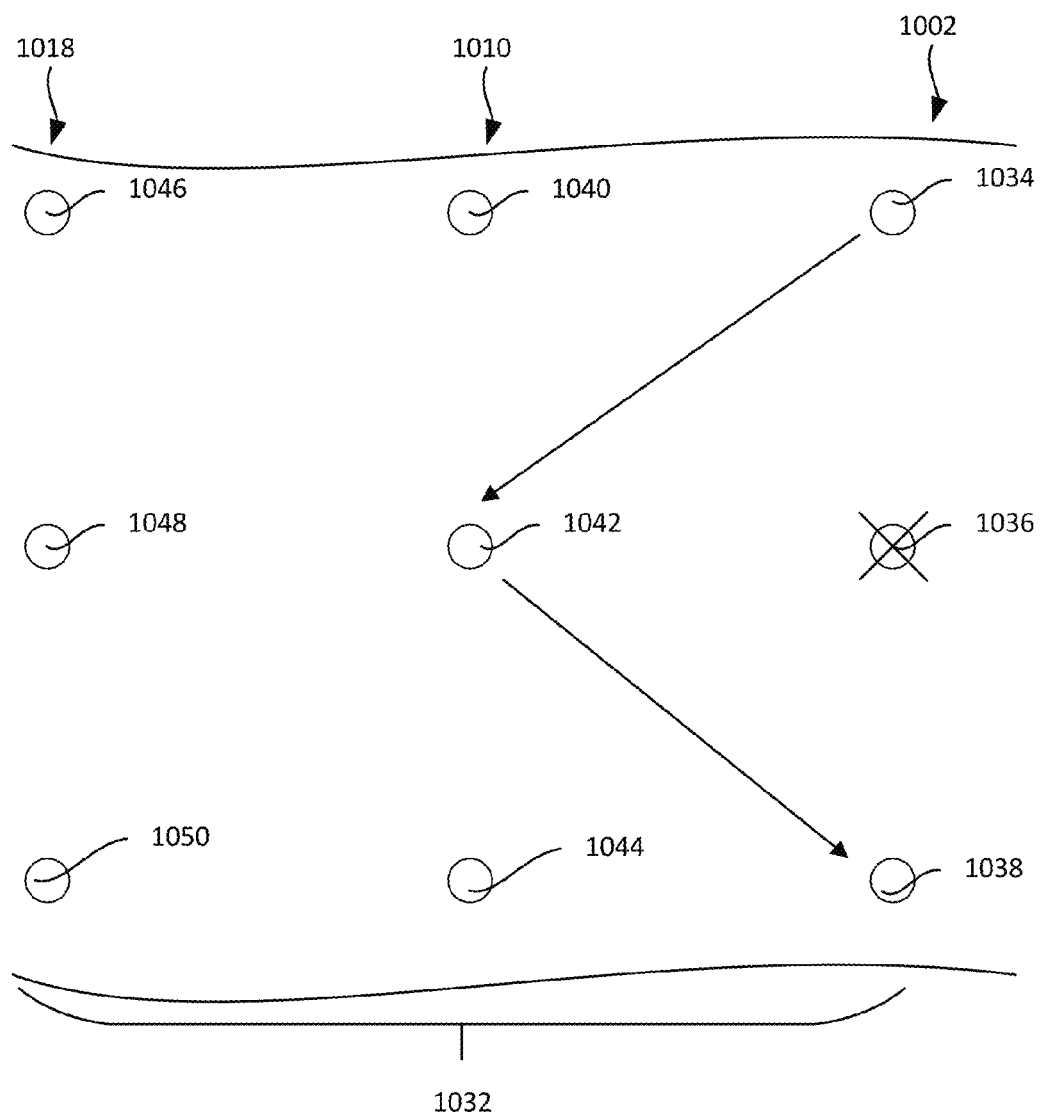
FIG. 25 illustrates an embodiment of a plurality of adjacent serial data transfer paths in which an idle duty cycle period of an adjacent transfer module is used to skip heal a malfunctioning data transfer module in a given serial data transfer path.

With further reference to FIG. 25, a method for skip healing a serial data transfer path with a malfunctioning data transfer module is shown. Such a skip healing technique may be facilitated by a dimensioning technique as illustrated below. Specifically, a first line 1026 may comprise data transfer module 1034, data transfer module 1036, data transfer module 1038. A second line 1028 may comprise a data transfer module 1040, a data transfer module 1042, and a data transfer module 1044. A third line 1030 may comprise a data transfer module 1046, a data transfer module 1048, and a data transfer module 1050. The first line 1026, the second serial data transmission line 1028, and the third serial data transmission line 1030 may comprise a group 1032. Accordingly, during normal operation utilizing dimensioning described above in FIGS. 22-23, the first line 1026 may operate during a first period of the duty cycle, the second line 1028 may operate during second period of the duty cycle, and the third line 1030 may operate during a third period of the duty cycle.

However, it may be appreciated that a given data transfer module a serial data transfer path may malfunction such that the module may not participate in relay of seismic data along serial data transfer path represented by the line of data transfer modules. For example, data transfer module 1036 may be malfunctioning in FIG. 25. Accordingly, use of the directionalized antennas of data transfer module 1034, data transfer module 1042, and data transfer module 1038 may be utilized during the first duty cycle period to skip heal the first line 1026. Specifically, data transfer module 1034 may use a directionalized antenna to target data transfer module 1042 during the first duty cycle period and data transfer module 1042 may use a directionalized antenna to target data transfer module 1038. In this regard, the malfunctioning data transfer module 1036 may be skipped over or detoured utilizing an otherwise idle data transfer module from an adjacent line. That is, because data transmission module 1042 would otherwise be idle during first period of the duty cycle, data transmission module 1042 is available to assist in skip healing the first line 1026 in the first time period of the duty cycle. The operation of the second line 1028 may not be affected as data transfer module 1024 may still be available for serial data communication with data transfer module 1040 and data transfer module 1044 in the second period of the duty cycle when the first line 1026 goes idle. Accordingly, the dimensioning technique described herein may utilize data transmission modules in adjacent, idle serial data transmission lines to assist in skip healing one or more malfunctioning modules in a given active serial data transmission line.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A data transfer module for use in a seismic survey, comprising:
a memory comprising non-transitive machine-readable instructions for operation of the data transfer module;
a microprocessor in operative communication with the memory to access the instructions; and
a controllably directionalized antenna that comprises a beamforming antenna having a plurality of discrete antenna elements, wherein the plurality of discrete antenna elements comprise at least a first discrete antenna element that is utilized for transmission in a directionalized transmission field pattern and at least a second discrete antenna element that is utilized for reception from a directionalized reception field pattern, wherein the microprocessor is operative to independently control the first discrete antenna element and the second discrete antenna element to independently control the directionalized transmission field pattern and the directionalized reception field pattern, wherein the microprocessor is operative to control the directionalized antenna based on the instructions for simultaneous transmission of data in a first direction and reception of data from a second direction, and wherein the first direction is different than and substantially opposite to the second direction;
a transmitter in operative communication with the first discrete antenna element and operative to receive a first signal from the microprocessor for control of the first discrete antenna element to transmit the first signal using the first discrete antenna element; and
a receiver in operative communication with the second discrete antenna element and operative to receive a second signal via the second discrete antenna element to provide the second signal to thy microprocessor;
wherein the transmitter and the receiver are operative to communicate with the controllably directionalized antenna via a switch for selective control of the respective one of the first discrete antenna element and the second discrete antenna element.

2. The data transfer module of claim 1, wherein a common transceiver operates both the first discrete antenna element and the second discrete antenna element.

3. The data transfer module of claim 1, further comprising:
a chassis within which the memory and microprocessor are disposed;
wherein the chassis comprises a plurality of discrete antenna elements comprising at least the first and the second discrete antenna elements, and wherein the plurality of discrete antenna elements are elevated above the surface of the Earth.

4. The data transfer module of claim 3, wherein the chassis comprises the plurality of discrete antenna elements, and wherein the chassis is disposed on a support structure to elevate the plurality of discrete antenna elements above the surface of the Earth.

5. The data transfer of claim 3, further comprising:
a mast having a first end operatively attached with the chassis and a second end, opposite the first end, at which the first discrete antenna element and the second discrete antenna element are located, and wherein the mast extends from the chassis such that the second end is separated from the first end by an antenna height.

6. The data transfer module of claim 5, wherein the mast comprises a cylindrical antenna support disposed at the second end, wherein the first discrete antenna element and the second antenna element are disposed at opposite relative orientations relative to the cylindrical antenna support;
wherein the cylindrical antenna support comprises a plurality of antenna elements including the first discrete antenna element, the second discrete antenna element, and at least one other discrete antenna element.

7. The data transfer module of claim 3, wherein the plurality of antenna elements comprises at least 8 discrete antenna elements.

8. The data transfer module of claim 3, further comprising:

at least one waveguide disposed relative to the plurality of discrete antenna elements to reduce interference of the first discrete antenna and the second discrete antenna element.

9. The data transfer module of claim 8, wherein the at least one waveguide comprises a metallic fin extending between the first discrete antenna element and the second discrete antenna element.

10. The data transfer module of claim 8, wherein the at least one waveguide comprises a metallic shield extending relative to the plurality of discrete antenna elements and having slotted apertures disposed relative to each of the first discrete antenna element and the second discrete antenna element that limit the radio field of the respective first discrete antenna element and the second discrete antenna element.

11. The data transfer module of claim 3, wherein an azimuth angle of the radiation field pattern is 70° or narrower for each discrete antenna element, and wherein a polar angle of the radiation field pattern is 140° or wider for each discrete antenna element.

12. The data transfer module of claim 1, wherein the transmission of data in the first direction uses a first radio mode, and wherein the reception of data in the second direction uses a second radio mode.

13. The data transfer module of claim 12, wherein the first mode uses a first frequency and the second mode uses a second frequency different than the first frequency.

14. The data transfer module of claim 13, wherein the first mode uses a first circular polarity and the second mode uses a second circular polarity different than the first circular polarity.

15. The data transfer module of claim 1, further comprising:
 a geophone for acquisition of seismic data;
 wherein the seismic data acquired by the geophone is transmitted in the first direction to another module in the seismic survey.

16. The data transfer module of claim 1, wherein the module is in operative wireless communication with one or more acquisition modules remote from the data transfer module such that the data transfer module receives seismic data from the one or more acquisition modules, and wherein the seismic data received from the one or more acquisition modules is transmitted in the first direction.

17. The data transfer module of claim 16, wherein the data transfer module does not include a seismic sensor, wherein the data transfer module communicates with the one or more acquisition modules using a second radio having a second radio mode different than a first radio having a first radio mode that utilizes the directionalized antenna.

18. The data transfer module of claim 1, wherein the reception of data from the second direction is from an upstream module in the seismic survey relative to the module, and wherein the transmission of data in the first direction is to a downstream module in the seismic survey relative to the module.

19. The data transfer module of claim 18, wherein seismic data received from the upstream module from the second direction is transmitted in the first direction to the downstream module.

* * * * *

UNITED STATES PATENT AND TRADEMARK OFFICE
CERTIFICATE OF CORRECTION

PATENT NO. : 9,930,430 B2  
APPLICATION NO. : 15/290763  
DATED : March 27, 2018  
INVENTOR(S) : Elder Page 1 of 1

It is certified that error appears in the above-identified patent and that said Letters Patent is hereby corrected as shown below:

In the Claims

Column 28, Line 24, delete "to thy microprocessor" and insert therefore --to the microprocessor--

Signed and Sealed this
Twenty-ninth Day of May, 2018

Andrei Iancu
*Director of the United States Patent and Trademark Office*